(12) United States Patent
Dietrich et al.

(10) Patent No.: US 12,282,040 B2
(45) Date of Patent: Apr. 22, 2025

(54) MICRO-OPTOMECHANICAL SYSTEM AND METHOD FOR THE PRODUCTION THEREOF

(71) Applicant: Karlsruher Institut für Technologie, Karlsruhe (DE)

(72) Inventors: Philipp-Immanuel Dietrich, Igersheim (DE); Gerald Goering, Karlsbad (DE); Matthias Blaicher, Ettlingen (DE); Mareike Trappen, Karlsruhe (DE); Hendrik Hölscher, Weingarten (DE); Christian Koos, Siegelsbach (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 196 days.

(21) Appl. No.: 15/733,175

(22) PCT Filed: Dec. 4, 2018

(86) PCT No.: PCT/EP2018/083414
§ 371 (c)(1),
(2) Date: Jun. 4, 2020

(87) PCT Pub. No.: WO2019/110548
PCT Pub. Date: Jun. 12, 2019

(65) Prior Publication Data
US 2021/0096152 A1    Apr. 1, 2021

(30) Foreign Application Priority Data

Dec. 5, 2017    (DE) ................. 10 2017 221 952.1

(51) Int. Cl.
*G01Q 20/02*        (2010.01)
*G01H 9/00*        (2006.01)
(Continued)

(52) U.S. Cl.
CPC ........... *G01Q 10/045* (2013.01); *G01H 9/006* (2013.01); *G01Q 20/02* (2013.01); *G01Q 60/06* (2013.01);
(Continued)

(58) Field of Classification Search
CPC ................. G01Q 70/16; G01Q 60/24
See application file for complete search history.

(56) References Cited

U.S. PATENT DOCUMENTS 6,330,824 B1    12/2001    Erie et al.
7,637,149 B2    12/2009    Degertkin et al.
(Continued)

FOREIGN PATENT DOCUMENTS

WO    WO-2011031142 A1 *    3/2011    ............. G01D 5/268
WO    2016073999 A1    5/2016

OTHER PUBLICATIONS

Gellineau et al., 'Optical Fiber Atomic Force Microscope with Photonic Crystal Force Sensor', 2015, 2015 Transducers—2015 18th International Conference on Solid-State Sensors, Actuators and Microsystems (Transducers) (Year: 2015).*

(Continued)

*Primary Examiner* — Eliza W Osenbaugh-Stewart
(74) *Attorney, Agent, or Firm* — Woodard, Emhardt, Henry, Reeves & Wagner, LLP

(57) ABSTRACT

The present invention relates to a micro-optomechanical system (500) and to a method for the production thereof. The micro-optomechanical system (500) comprises
at least one optical subsystem (100) configured for emitting at least one optical actuator signal (212) and for receiving at least one optical sensor signal (211); and
at least one optomechanical structure (150) which is producible in direct contact with the optical subsystem (100) by means of a direct writing microstructuring (Continued)

method, wherein the optical subsystem (100) comprises at least one optical actuation element (219) and at least one optical sensor element (140), wherein the optical actuator signal (212) in interaction with the optical actuation element (219) is configured for changing a mechanical state of the optomechanical structure (150), and wherein the optical sensor signal (211) in interaction with the optical sensor element (140) is configured for detecting the change in the mechanical state of the optomechanical structure (150) or a variable related thereto.

The micro-optomechanical systems (500) provided have virtually any desired shaping in conjunction with very high resolution and are therefore suitable for a wide range of applications.

32 Claims, 11 Drawing Sheets

(51) Int. Cl.
*G01Q 10/04* (2010.01)
*G01Q 60/06* (2010.01)
*G01Q 60/24* (2010.01)
*G02B 26/08* (2006.01)
*G01B 9/02017* (2022.01)

(52) U.S. Cl.
CPC ...... *G02B 26/0841* (2013.01); *G01B 9/02021* (2013.01)

(56) References Cited

U.S. PATENT DOCUMENTS

| | | | |
|---|---|---|---|
| 9,869,695 B1* | 1/2018 | Drechsler | G01Q 20/04 |
| 2006/0162455 A1 | 7/2006 | Kawakatsu | |
| 2009/0002714 A1 | 1/2009 | Iannuzzi et al. | |
| 2015/0285836 A1 | 10/2015 | Humphris et al. | |
| 2016/0202288 A1* | 7/2016 | Erickson | G01Q 60/24 850/40 |
| 2018/0106830 A1* | 4/2018 | Fantner | G01Q 20/02 |
| 2018/0281324 A1* | 10/2018 | Gießen | B33Y 10/00 |

OTHER PUBLICATIONS

Li, Jun et al., "A Micro-Machined Optical Fiber Cantilever as a Miniaturized pH Sensor", IEEE Sensors J., vol. 15, No. 12, 2015. 8 pages.
Bayindir, Z. et al., "Polymer microcantilevers fabricated via multiphoton absorption polymerization", Appl. Phys. Lett. 86, p. 064105, 2005. 4 pages.
Wang, Hui et al., "A miniaturized optical fiber microphone with concentric nanorings grating and microsprings structured diaphragm", Optics & Laser Technol. 78, pp. 110-115, 2016. 6 pages.
Minh, Phan Ngoc et al., "Hybrid optical fiber-apertured cantilever near-field probe", Appl. Phys. Lett. 79, p. 3020, 2001. 4 pages.
Ianuzzi, Davide et al., "Fibre-top cantilevers: design, fabrication and applications", Meas. Sci. Technol. 18 pp. 3247-3252, 2007. 7 pages.
Umeda, N. et al., "Scanning attractive force microscope using photothermal vibration", J. Vac. Science & Technol. B: Microelectronics and Nanometer Structures Processing, Measurement, and Phenomena 9, pp. 1318-1322, 1990. 6 pages.
Goering, Gerald et al., "Tailored probes for atomic force microscopy fabricated by two-photon polymerization", Appl. Phys. Lett. 109, p. 063101, 2016. 6 pages.
Adam, Holger et al.; "Photothermal excitation setup for a modified commercial atomic force microscope"; Review of Scientific Instruments 85, 023703 (2014). 5 pages.
Kiracofe, Daniel. et al; "High efficiency laser photothermal excitation of microcantilever vibrations in air and liquids"; Review of Scientific Instruments 82, 013702 (2011). 8 pages.
Gruca, G. et al., "Demonstration of an optically actuated ferrule-top device for pressure and humidity sensing." Sensors and Actuators A: Physical, NL. vol. 190, Nov. 21, 2012, pp. 77-83. 7 pages.
Yao, Mian et al., "Optically 3-D µ-Printed Ferrule-Top Polymer Suspended-Mirror Devices." IEEE Sensors Journal, IEEE Service Center, New York, NY, US. vol. 17, No. 22, Nov. 15, 2017, pp. 7257-7261. 5 pages.

* cited by examiner

MICRO-OPTOMECHANICAL SYSTEM AND METHOD FOR THE PRODUCTION THEREOF

FIELD OF THE INVENTION

The present invention is in the field of optomechanics, in particular micro-optomechanics, and relates to a micro-optomechanical system having at least one optical subsystem and at least one optomechanical structure, and to a method for the production thereof.

In this case, the optical subsystem can preferably include optical fibers, plug systems for optical fibers or integrated optical circuits, wherein the integrated optical circuit can preferably comprise photodetectors, light sources, optical modulators or passive optical components such as power splitters or filters. In particular, the optical subsystems can be integrated optical chips appertaining to optical telecommunications. Furthermore, the optical subsystem can also comprise lasers and photodiodes as well as other active optical components. However, the optical subsystem can also comprise just a single component from among the components mentioned above and can be connectable to further subsystems in an inseparable manner or by means of a plug system. However, other types of optical subsystems are conceivable.

Optomechanical systems preferably find application in measurement technology, sensor technology, metrology, material sciences, life sciences, medical technology and optical communication technology. Further areas of use are conceivable.

PRIOR ART

The prior art discloses optomechanical systems, in particular in the form of cantilevers, which are used for measurements of surface profiles according to the principle of an atomic force microscope (AFM), the cantilever being equipped with a tip in one particularly preferred embodiment. The term cantilever here denotes a beam (cantilever beam) that is clamped on one side and is suitable for oscillation. During a measurement, an oscillating cantilever is moved over a sample in scanning fashion and an effect of the interaction between sample and tip on the cantilever is detected metrologically. Laser beams are typically used for metrologically detecting a deflection of the cantilever, said laser beams being deflected upon reflection at the cantilever. The cantilever is often excited to oscillate by means of a suitable force, for example applied by a piezoactuator. This mode of operation of the cantilever is referred to as a dynamic mode of operation. The cantilever is often equipped with a tip, too, which makes it possible to measure a topography with very high lateral resolution. In this case, the lateral resolution describes the ability to distinguish between objects in an area defined by the sample surface. In an alternative embodiment, it is possible to illuminate the tip and to measure the attendant interaction with the sample. By virtue of the constitution of the tip, this interaction between light, the sample and the tip can be manifested locally very differently and be far smaller than the wavelength used. This method is known as scanning near-field optical microscopy (SNOM) or near-field scanning optical microscopy (NSOM).

Cantilevers are generally produced by means of anisotropic etching processes using silicon or silicon nitride. In this case, it is also possible to produce tips such as are required for producing AFM cantilevers, for example. In this case, the shaping of the cantilever can be restricted in a process-dictated manner as a result of use of mask-based two-dimensional lithography methods. Moreover, control over properties of the cantilever is often inadequate. This can be manifested for example in a typical variation of the resonant frequency of up to 50%. Furthermore, the production of the tip can be adjusted with regard to shaping and size only in a very restricted way. There is the possibility of adding a tip by means of subsequent adhesive bonding. However, this method constitutes a manual and thus poorly reproducible process that is not suitable for commercial use. The production of tips by means of two-photon polymerization can compensate for this disadvantage, but allows only limited control over the mechanical properties of the cantilever. Furthermore, integrating such a cantilever into an optical system for operation in an AFM is very complex. In this case, an AFM measurement necessitates manual alignment of a measurement laser. More complex tasks such as SNOM measurements require a primarily manual production method, wherein an optical fiber which is elongated by thermal heating and the tip of which is used later as an optical measurement tip is adhesively bonded to a quartz oscillator and then metal is vapor-deposited thereon. In this case, an optical fiber denotes a typically dielectric optical waveguide having a fiber core having a higher refractive index in comparison with the refractive index of a cladding. This difference in refractive index makes it possible to localize the light in the core of the fiber. However, the method presented is complex and poor in terms of scalability and has only low reproducibility. However, similar processes for producing optical tips which are based on a chemical etching process also have low reproducibility and a high proportion of manual work steps. Further problems arise in the case of an SNOM measurement since here it is necessary for light that penetrates into the tip or leaves the tip to be gathered as it emanates from the tip or to be focused at the tip by means of an optical unit that is to be aligned with micrometer accuracy. The described disadvantages in the context of producing and using cantilevers have restricted particularly the use of SNOM primarily to research tasks.

Furthermore, optomechanical systems for applications in sensor systems are known, wherein here, too, the optomechanical systems can be designed as cantilevers, in particular. In this case, by way of example, a pH value of a liquid is detected metrologically. For this purpose, a cantilever can be coated with different materials, such that different bending of the cantilever occurs for different pH values.

J. Li et al., "A Micro-Machined Optical Fiber Cantilever as a Miniaturized pH Sensor", IEEE Sensors J., Vol. 15, No. 12, 2015, describe a method and an arrangement for carrying out measurements of the pH value by means of cantilevers fabricated on fiber facets by way of subtractive manufacturing. The possibility of using optically read sensor systems in surrounding liquids is proposed here. The arrangement is a pure sensor system, however, wherein the movement of the cantilevers that is to be measured is brought about exclusively by the pH value of the surrounding solution. The manufacturing method described has the previously explained disadvantages of subtractive methods.

Additional problems can occur in the case of optical subsystems which have small mode fields and can thus be embodied as single-mode components, in particular. In optical communication technology, it is particularly advantageous to align an optomechanical structure with an accuracy in relation to a telecommunications optical subsystem which is in the region of the mode field diameter of the light field of the optical subsystem. With conventional positioning and fixing methods, a precise alignment is not possible in a reproducible manner since the mode field diameter is typically only 0.5 µm to 5 µm, however. In addition, it would be particularly advantageous for the efficiency with which light leaves the optical subsystem and couples into the optical subsystem again after reflection or impingement at the optomechanical system to be as high as possible. This objective, too, has not been able to be adequately achieved using existing manufacturing technologies.

Furthermore, optomechanical systems for applications in sensor technology are known. Here the optical structure of the optomechanical system can be part of an optical component, such as e.g. of a resonator or of an interferometer, which can change as a result of being acted on by mechanical oscillations.

Z. Bayindir et al., "Polymer microcantilevers fabricated via multiphoton absorption polymerization", Appl. Phys. Lett. 86, page 064105, 2005, describe a method for producing cantilevers using two-photon polymerization. However, the cantilevers thus produced serve only for characterizing the mechanical properties of the printed material and have neither actuator nor sensor functionalities.

H. Wang et al., "A miniaturized optical fiber microphone with concentric nanorings grating and microsprings structured diaphragm", Optics & Laser Technol. 78, pages 110-15, 2016, describe an optical microphone produced by 3D printing, which microphone was fabricated on the facet of an optical fiber. This arrangement constitutes a purely optically readable sensor system and has no devices for optically actuating the geometry produced by 3D printing.

P. Minh et al., "Hybrid optical fiber-apertured cantilever near-field probe", Appl. Phys. Lett. 79, page 3020, 2001, describe a method and an arrangement for carrying out SNOM measurements with cantilevers integrated at fiber ends. In this case, only the position of the cantilever is read out by means of an optical signal; optical excitation is not described. Conventional subtractive microfabrication methods are used for producing the cantilevers, as a result of which the geometries achievable thereby are greatly restricted.

D. Ianuzzi et al., "Fibre-top cantilevers: design, fabrication and applications", Meas. Sci. Technol. 18 pages 3247-52, 2007, describe a method for producing cantilevers at fiber ends which is based on a conventional subtractive microfabrication method and does not provide any possibility for optomechanically exciting the cantilevers.

N. Umeda et al., "Scanning attractive force microscope using photothermal vibration", J. Vac. Science & Technol. B: Microelectronics and Nanometer Structures Processing, Measurement, and Phenomena 9, pages 1318-1322, 1990, describe a method and an arrangement for optomechanically exciting and optically measuring cantilevers with regard to the position thereof. The arrangement described therein comprises a conventional AFM laboratory set-up in which a cantilever produced by conventional microfabrication methods has to be aligned with high precision relative to the other components of the set-up. Thus, the diversity of the structure geometries that are achievable by means of additive or direct writing manufacturing methods cannot be used, nor is the proposed method applicable to compact systems or array arrangements. The same restrictions apply to WO 2016/073999 A1, which discloses the optical excitation of a cantilever for AFM measurements using a macroscopic optical set-up.

G. Goering et al., "Tailored probes for atomic force microscopy fabricated by two-photon polymerization", Appl. Phys. Lett. 109, page 063101, 2016, describe a method for producing freeform tips and structures on existing cantilevers using two-photon polymerization.

U.S. Pat. No. 7,637,149 B2 discloses a micro-optomechanical force and position sensor in which the deflection of a measurement tip is detected with the aid of optical interference effects of light diffracted at one or more optical gratings, for which a special read-out method is used. Electrostatic and piezoelectric methods for actuating the measurement tip are additionally proposed. The sensor element and the associated gratings are produced completely using conventional microfabrication methods.

U.S. Pat. No. 6,330,824 B1 discloses an atomic force microscope having a cantilever in solution, wherein the cantilever is subjected to energy in order to bend and to vibrate and in order to determine the amplitude of the vibration from the energy.

H. Adam et al.; "Photothermal excitation setup for a modified commercial atomic force microscope"; Review of Scientific Instruments 85, 023703 (2014), describe the extinction of undesired cantilever resonances in atomic force microscopy in solution.

US 2006/0162455 A1 discloses a method and a device for determining the vibration frequency of a cantilever array by means of optical pumping and optical measurement. For this purpose, the cantilevers are excited successively at their excitation frequencies by means of modulated optical excitation and the vibrations are detected by a laser Doppler device.

D. Kiracofe et al; "High efficiency laser photothermal excitation of microcantilever vibrations in air and liquids"; Review of Scientific Instruments 82, 013702 (2011), describe the excitation of microcantilevers for atomic force microscopy by means of photothermal excitation, wherein the probe to be acted on photothermally preferably has a trapezoidal cross section.

OBJECT OF THE INVENTION

Proceeding therefrom, the object of the present invention is to provide a micro-optomechanical system and a method for the production thereof which at least partly overcome the explained disadvantages and restrictions of the prior art.

In particular, the intention is to specify a production method which allows the provision of mechanical structures in a robust and automatable production process with the highest possible dimensional accuracy, the highest possible resolution, the greatest possible geometric diversity in three dimensions and the best possible reproducibility and allows them to be combined with optical systems with high relative positioning accuracy. In comparison with known optomechanical systems, the optomechanical systems thus obtained are intended to afford significant advantages with regard to compactness, robustness, production costs and scalability.

DISCLOSURE OF THE INVENTION

This object is achieved by means of a micro-optomechanical system and a method for the production thereof having the features of the independent patent claims. Advantageous developments, which are realizable individually or in any desired combination, are presented in the dependent claims.

Hereinafter the terms "have", "comprise", "encompass" or "include" or any grammatical deviations therefrom are used in a non-exclusive way. Accordingly, these terms can refer either to situations in which, besides the features introduced by these terms, no further features are present, or to situation in which one or more further features are present. By way of example, the expression "A has B", "A comprises B", "A encompasses B" or "A includes B" can refer either to the situation in which, apart from B, no further element is present in A (i.e. to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms, if they are used in association with one or more elements or features, are intended to express the fact that the element or feature can be provided singly or multiply, are generally used just once, for example when the feature or element is introduced for the first time. When the feature or element is subsequently mentioned again, the corresponding term "at least one" or "one or more" is generally no longer used, without this restricting the possibility that the feature or element can be provided singly or multiply.

Furthermore, hereinafter the terms "preferably", "in particular", "for example" or similar terms are used in connection with optional features, without alternative embodiments thereby being restricted. In this regard, features introduced by these terms are optional features and there is no intention for the scope of protection of the claims, and in particular of the independent claims, to be restricted by these features. In this regard, the invention, as will be recognized by the person skilled in the art, can also be carried out using other configurations. In a similar manner, features introduced by "in one embodiment of the invention" or by "in one exemplary embodiment of the invention" are understood as optional features, without alternative configurations or the scope of protection of the independent claims being intended to be restricted thereby. Furthermore, these introductory expressions are intended to have no effect on all possibilities of combining the features introduced thereby with other features, whether they be optional or non-optional features.

In a first aspect, the present invention relates to a micro-optomechanical system, comprising:
 at least one optical subsystem configured for emitting at least one optical actuator signal and for receiving at least one optical sensor signal; and
 at least one optomechanical structure which is producible in direct contact with the optical subsystem by means of a direct writing microstructuring method, wherein the optical subsystem comprises at least one optical actuation element and at least one optical sensor element,
 wherein the optical actuator signal in interaction with the optical actuation element is configured for changing a mechanical state of the optomechanical structure, and wherein the optical sensor signal in interaction with the optical sensor element is configured for detecting the change in the mechanical state of the optomechanical structure or a variable related thereto.

The "micro-optomechanical system" proposed here thus relates to a device which, by means of an optical excitation provided by the optical subsystem, can both bring about and detect a change in a mechanical state of the optomechanical structure. The term "change" here denotes an alteration of the mechanical state of the optomechanical structure over time. The term "optomechanical system" thus denotes a device having both optical components and mechanical components, wherein further components, in particular electronic or electromechanical components, can additionally be present. The prefix "micro-" here denotes a circumstance that the optical components and/or the mechanical components, preferably the optical components and the mechanical components, are present here as micro-optical components and/or micro-mechanical components and in this case have structures which can assume dimensions of less than 10 μm, preferably less than 2 μm, particularly preferably less than 500 nm.

As already mentioned, the proposed micro-optomechanical system comprises both at least one optical subsystem and at least one optomechanical structure. The term "micro-optical subsystem" or simply "optical subsystem" here denotes an optical arrangement comprising at least one micro-optical component which is provided in the form of at least one unit and which is preferably able to generate, to receive, to process or to transport an optical actuator or sensor signal. In this regard, the optical subsystem can have for example an array of optical fibers such as single- or multimode fibers or an optical fiber having a plurality of fiber cores (multi-core fiber). Alternatively or additionally, the optical subsystem can have an optical plug or a plug system that can be secured to a fiber array or a multi-core fiber. Further fiber-optic components are possible. Furthermore, an integrated optical chip (referred to as Photonic Integrated Circuit, PIC) comprising optical waveguides, in particular silicon waveguides, silicon nitride waveguides, doped glass, glass waveguides or indium phosphide waveguides can be provided in the optical subsystem. The optical subsystem can comprise further optical components, in particular lasers; amplifiers, preferably semiconductor amplifiers; optical resonators or photodiodes. Furthermore, the optical subsystem can have one or more optical components produced beforehand by replication. Furthermore, the optical subsystem can also be an optomechanical structure described in greater detail below. Further configurations of the optical subsystem are conceivable. Furthermore, the optical subsystem can constitute or have an optical component situated therein or other structures produced by means of a 3D direct writing method. In this case, the optical subsystem can be configured in such a way that an optical signal emanating from the optical subsystem can be fed back again into the same optical subsystem or into a further optical subsystem. Feeding back the optical signal can be effected in particular by reflection, diffraction or refraction at an optomechanical structure.

The present optical subsystem is configured to the effect that it can couple out at least one optical actuator signal, wherein at least one optical sensor signal can be coupled into the same optical subsystem or, alternatively or additionally, into a further optical subsystem. The optical actuator signal and the optical sensor signal can be the same optical signal or, preferably, two mutually different optical signals. The term "optical signal" here denotes a physically detectable measurement signal which can be emitted or received on an electromagnetic carrier wave, which, for the present invention, can have in particular a wavelength in the optical range and/or in the near, mid and/or far infrared range and/or in the terahertz range and/or in the microwave range of the electromagnetic spectrum. In this case, a distinction can generally be drawn between the optical actuator signal and the optical sensor signal. The "optical sensor signal" is an optical signal which can implement at least one sensor function, wherein the term "sensor function" should be understood to mean that the optical sensor signal is emitted by an optical sensor element and carries information which is related to a measurement variable ascertained by the optical sensor element. In contrast thereto, the "optical actuator signal" is a further optical signal which can implement at least one actuator function, wherein the term "actuator function" describes an instruction which can be triggered by means of the optical actuator signal. In one particular configuration, an optical signal can comprise both the optical actuator signal and the optical sensor signal and can thus have both an actuator function and a sensor function. In one particular configuration, the optical subsystem can additionally be configured for generating at least one further optical actuator signal which can interact in particular with a partial region of the optomechanical structure. In a further particular configuration, the optical subsystem can additionally be configured for detecting at least one further optical sensor signal which has interacted in particular with a partial region of the optomechanical structure. The optical subsystem can furthermore have beam-shaping optical elements configured for modifying a direction of propagation and/or a shape of the light emitted and/or light to be coupled in by the optical subsystem.

In contrast thereto, the "micro-optomechanical structure" or simply the "optomechanical structure" comprises at least one micro-optical component and also at least one micro-mechanical component. Further components, in particular electronic or electromechanical components or else further optical or mechanical components, can additionally be present. According to the invention, the optomechanical structure is producible in direct contact with the optical subsystem by means of a direct writing microstructuring method or was produced in direct contact with the optical subsystem in particular by means of the direct writing microstructuring method. The term "direct writing microstructuring method" here encompasses such a method which can convert a structure present in the form of a data set into a physical structure without employing a mask produced beforehand. The term "direct writing" here denotes direct production of the structure in the material provided therefor. The direct writing method used here can preferably be selected from a lithographic method or an additive method, in particular from a group comprising direct writing ultraviolet lithography, electron beam direct writing, two-photon polymerization, stereolithography, and inkjet printing. Through the use of the direct writing method, optomechanical structures that can have virtually any three-dimensional shapes with micrometer and/or nanometer scale resolutions are producible in direct contact with the optical subsystem in a single method step or else, optionally, in a plurality of method steps. A device for producing the optomechanical structure can accurately detect the position of the optical subsystem. As a result of this high alignment accuracy before or during the production of the optomechanical structure in relation to the optical subsystem, a subsequent alignment of the optomechanical structure with respect to the optical subsystem can be obviated. The term "direct contact" here denotes the fact that the optomechanical structure and the optical subsystem directly adjoin one another. The proposed micro-optomechanical systems can thus surpass traditional optomechanical systems with regard to compactness and robustness and can thus open up entirely new fields of application.

In one preferred embodiment, the optomechanical structure can have different partial regions which are producible by means of the direct writing microstructuring method, controllable with variable parameters, and/or by at least two direct writing microstructuring methods applied sequentially, in particular in an additional manufacturing step indirectly or directly upstream or downstream of the direct writing microstructuring method. In this case, a photoresist used in the microstructuring method can preferably be supplemented by additional components before or after the respective production step. As a result, different reactions of the different partial regions can occur when the light is radiated in, in particular as a result of a different expansion upon heating, as a result of a phase transition and/or a different photochemical expansion. In particular, a partial region of the optomechanical structure can be designed in such a way that it enables a material to have a high linear expansion upon light or heat input. This can be brought about for example by means of a surface structuring of the partial region of the optomechanical structure which is configured for this purpose and by means of which an order can be impressed on a subsequently applied material at the molecular level. Alternatively or additionally, a different light absorption can occur in the different partial regions, as a result of which a different expansion can be effected in the different partial regions of the optomechanical structure. In one particular configuration, the form of the optomechanical structure can depend on a relative position of optical coupling points described in greater detail below, wherein it can be advantageous that the form of the optomechanical structure is able to be fixed only during the manufacturing process after the position of all parts or of a part of the coupling point has been detected.

The optomechanical structure can be fitted directly to or on the optical subsystem. Alternatively, the optomechanical structure can also be fitted to or on a mount that can be fixedly connected to the optical subsystem. In particular, the mount can also be a structure produced by a microstructuring method for three-dimensional structures, in particular two-photon lithography. The mount can be producible in the same method step as the optomechanical structure. In one particular configuration, in this case, the optomechanical structure can be fitted to a facet of an optical subsystem, wherein the term "optical facet" or simply "facet" denotes at least one surface of the optical subsystem at which light can be coupled in and/or coupled out and/or reflected.

In one particular configuration, unwanted backreflections of light beams and/or feedbacks from the optomechanical structure into the optical subsystem can be avoided by virtue of the fact that, in the course of applying the direct writing microstructuring method, at least one tilted surface is produced which assumes an angle in relation to a beam direction of the light beam used in the microstructuring method.

In one particular configuration, a multiplicity of optomechanical structures can be arranged on one or more optical subsystems. These can be suitable, in particular, for simultaneously measuring the constitution of a sample. In this case, all the optomechanical structures can be individually controllable by means of an excitation, preferably by means of a deformation, by the optical actuator signal.

In this case, the proposed optomechanical structure comprises at least one optical actuation element and also at least one micro-mechanical component and at least one optical sensor element and at least one micro-optical component. The term "optical actuation element" or "optomechanical actuator element" here denotes an arrangement which can bring about a change in an optomechanical state variable of the optomechanical structure as a result of impingement of light. The term "optomechanical state variable" or simply "mechanical state" of the optomechanical structure here relates to an optical accessible mechanical property of the optomechanical structure. For this purpose, the optomechanical structure can preferably have an optomechanical partial structure whose state can be altered by a movement or actuation, in particular in the form of bending, deflection, expansion, position and/or torsion, by means of an optical actuation element and can be determined by means of an optical sensor element. Preferably, in this case, the optomechanical structure can be excited to resonance by the optical actuation element. In this case, the change in the optomechanical state variable can be dependent on a power, a wavelength and/or a polarization of the light radiated in by the optical actuation element. The state variable can relate to one or more physical properties of the optomechanical structure, in particular to position, stress, modulus of elasticity, bending and/or torsion of a partial region of the optomechanical structure. In this case, the change in the state variable can be brought about by at least one effect that can be selected from a group comprising thermal expansion, light pressure, chemical-optical effect, phase transition accompanied by a length change, structure change, bending and build-up of a mechanical stress in the event of temperature change as a result of different coefficients of thermal expansion. In this case, the change in the mechanical state variable can also relate to the position of the entire optomechanical structure, wherein in addition the optical subsystem can also be concomitantly moved. Further types of effects are possible, however.

In this case, the optomechanical structure is excited by the optical actuator signal, already described, which proceeds from the optical subsystem and which is configured to deform the optomechanical structure or to excite it optomechanically in a different way. A different optomechanical excitation can preferably be effected by optothermal heating of the optomechanical structure. In one particularly preferred embodiment, the optothermal heating can take place directly at the surface of the optomechanical structure, for which purpose the surface can be provided with a light-sensitive coating in such a way that as much light as possible is absorbed. In other preferred embodiments, the surface of the optomechanical structure can be coated in such a way, or have a partial region configured in such a way, that a photochemical reaction brought about by means of impingement of light (light input) in the coating or the partial region can effect an expansion or a contraction of the optomechanical structure, i.e. an actuation or movement of the optomechanical structure. In one particularly preferred embodiment, for this purpose light can be used which cannot bring about any alteration processes and/or aging processes in the optomechanical structure and/or in the optical subsystem. In this particularly preferred embodiment, light can therefore be used which can have a wavelength in the visible range and/or in the near infrared range. In one particular configuration, wavelengths in the mid and/or far infrared, in the terahertz range and/or in the microwave range can also be used. Furthermore, the optomechanical structure can have structure elements having dimensions smaller than the wavelength of the light used for excitation and/or for readout, at which structure elements the light radiated in can be absorbed and heating can thus take place at the relevant location. In a further embodiment, an increased heating can occur as a result of a microstructuring of the optomechanical structure, which increased heating can bring about the actuation or movement. In further preferred embodiments, a surface tension on the optomechanical structure can be altered by means of impingement of light, or a light pressure or a light torque can be exerted on the optomechanical structure.

In contrast to the optical or optomechanical actuator element, the "optical sensor element" is an arrangement whose optical properties change upon impingement of light, particularly when, as in the present case, a state of the optomechanical structure changes. In particular, the optical sensor element can be configured to the effect of detecting a mechanical change in the optomechanical structure or a variable related thereto, preferably by detecting a variable of the optical signal coupled in. In particular, the optical sensor element can thus directly detect the mechanical change in the optomechanical structure. Alternatively or additionally, the optical sensor element can also detect the mechanical change in the optomechanical structure indirectly, however, by virtue of the fact that the optical sensor element can detect at least one physical variable which is correlated with the mechanical change in the optomechanical structure, and can deduce therefrom at least partly the mechanical change in the optomechanical structure. For this purpose, the optical sensor element can preferably have an optical cavity, the size and/or optical properties of which can change in the event of a mechanical deformation of the optomechanical structure. Other configurations of the optical sensor element are possible, however. In addition, the optomechanical structure can have further devices with which light can be guided from the optical subsystem and/or to the optical subsystem and/or which can be used for measurement tasks.

In a further preferred embodiment, the optomechanical structure can have a resonant or interferometric, optical structure. For this purpose, the optomechanical structure can be constituted in such a way that an optical resonator forms between optical subsystem and optomechanical structure. In a further configuration, said resonator can be completely or partly filled with a medium that enables lasing in the optical resonator. As a result of a deformation of the optomechanical structure, the optical resonator can be altered with regard to its expansion, for example. Furthermore, the optomechanical structure can have an optical grating that can influence the optical resonance. The optical resonance can be measured and regulated by the optical subsystem. In this configuration, the optomechanical structure can be constituted in such a way that at least one partial region of the optomechanical structure can be heated by the optical subsystem in such a way as to result in an alteration of the resonant frequency which is dependent on the heating. Alternatively or additionally, the optical actuation element can be configured to alter a transmission of the interferometric optical structure.

In one particular configuration, a feedback from the optomechanical structure into the optical subsystem can be achieved by means of an optical Fabry-Perot resonator established between the optomechanical structure and the optical subsystem. In this case, light can be reflected back and forth between the optomechanical structure and a facet of the optical subsystem. In particular, in this case, part of the light emerging at the facet of the optical subsystem can also be reflected back into the optical subsystem again. As a result of optical interference, a measurable amount of the light coupled into the optical subsystem can change in the event of an alteration of the wavelength used and/or an alteration of an optical path length of an optical resonator between the optical subsystem and the optomechanical structure. In particular, as a result of the alteration of the optical resonator, the position of the optomechanical structure can be detected metrologically.

In one particularly preferred embodiment, the resonator can be constituted in such a way that light can be reflected back and forth between the optomechanical structure and the optical subsystem with the least possible losses. This can be brought about in particular by means of a corresponding coating of the optomechanical structure and/or of the optical subsystem. As a result, it is possible to bring about a very sensitive alteration of the signal coupled into the optical subsystem in the event of an alteration of the optical path length of the optical resonator. This type of configuration can also be referred to as "high quality factor" of the optical resonator. Furthermore, the optomechanical structure can be embodied in such a way that the absolute value of the amplitude of the light which is coupled from the optical resonator into the optical subsystem can correspond exactly to that amplitude with which the light is reflected at the facet of the optical subsystem. A high extinction ratio can be achieved as a result. Besides the optical sensor and/or actuator element, the optomechanical structure can contain optical freeform elements which, as a result of their cooperation, can form in particular an optical resonator or an optical interferometer. The optical actuation can thus lead to a deformation and/or movement of the freeform elements and can be used in this way for tuning the resonant or interferometric optical structure. By way of example, tunable wavelength-selective filters can be provided in this way.

As already mentioned, the optical actuator signal proceeding from the optical subsystem can be configured to heat the optomechanical structure in such a way that an alteration of the shape or size of the optomechanical structure can occur as a result of a material expansion. In particular, this can involve inhomogeneous heating and thus an inhomogeneous material expansion which can bring about bending of the optomechanical structure. In particular, the inhomogeneous heating can be brought about by way of a surface coating of the optomechanical structure that can be designed to absorb light. Said coating can preferably comprise a metal such as aluminum, chromium, silver or gold. Optionally, an adhesion-promoting layer composed of chromium or titanium can additionally be applied between the optomechanical structure and the layer of gold or aluminum.

In a further particularly preferred configuration, the optomechanical structure can be equipped with a tip, which can have a radius of less than 100 nm, particularly preferably less than 50 nm, very particularly preferably less than 25 nm. Said tip can preferably be introduced into the optomechanical structure in such a way that, in the event of a mechanical interaction with a sample, said tip can mechanically alter the optomechanical structure, in particular bends it, or can damp an oscillation mode that occurs, or can alter it with regard to its resonant frequency. This mechanical alteration or a variable related thereto can be detected metrologically by the optical sensor element in the optical subsystem. In one particularly preferred configuration, the optomechanical structure can be fashioned here in such a way that it can be excited to oscillate by the optical subsystem, wherein the oscillation can be altered by an interaction of the tip with a sample, wherein this alteration can be detected by the optical subsystem. Particularly preferably, the optomechanical structure can be excited by the optical subsystem in such a way that the optomechanical structure oscillates at its resonant frequency, wherein, very particularly preferably, it can be excited by a slightly shifted resonant frequency. A mechanical interaction of the tip with a sample can thus be detected by means of a measurement of the oscillation amplitude by the optical subsystem. The optomechanical structure supplemented by a tip can scan the surface of a sample, for example, in order in this way to obtain information about, for example, a topology and/or an adhesion of the respective surface.

In a further preferred configuration, the optomechanical structure can have a device with which light from the optical subsystem can be focused to the tip present in the optomechanical structure. Said device can particularly preferably have freeform mirrors and/or freeform lenses. Furthermore, the tip of the optomechanical structure can be embodied in such a way that it can have an aperture at the apex of the tip. Said aperture can preferably have a diameter of less than 250 nm, particularly preferably less than 100 nm, very particularly preferably less than 50 nm. In this case, the optomechanical structure can be designed in such a way that light focused from the optical subsystem to the tip can pass through the aperture into the optical structure. Furthermore, the optomechanical structure can be designed in such a way that an amount of this light is dependent on the constitution of a sample that can be situated in direct proximity to the tip.

As already mentioned, the optomechanical structure can be moved by means of at least one optical actuator signal that can be provided by the optical subsystem. Preferably, a distance between the optomechanical structure and a sample can be set as a result. Alternatively or additionally, the optomechanical structure can be constituted in such a way that a movement which can be controlled by the optical actuator signal proceeding from the optical subsystem can be altered with regard to an amplitude, a direction of propagation and/or a phase by the further optical actuator signal proceeding from the optical subsystem. Furthermore, the optomechanical structure can also influence the further optical actuator signal with regard to the amplitude, the direction of propagation and/or the phase. In a further, particularly preferred arrangement, the optical subsystem can be moved by means of at least one further additional optical actuator signal.

In a further preferred configuration, the optomechanical structure can be designed in such a way that it can have a measurable deformation in the event of an acceleration of the optical subsystem supplemented by the optomechanical structure. By way of example, an optomechanical structure having a low spring constant and a high mass can be used for this purpose.

In one particular configuration, the optomechanical structure can be acted on in its mechanical state by means of an optical actuator signal which is generated by an optical subsystem and which can be modulated periodically with a predefined frequency. Here, too, the change in the mechanical state of the optomechanical structure can be demonstrated by the optical sensor signal of the optical subsystem or of a further optical subsystem. A thus physical variable can be determined as a result of an alteration of the optical sensor signal in the case of a determined optical actuator signal. This can be made possible in particular by evaluation only of frequency components of the sensor signal which correspond to the actuator signal or an integral multiple thereof.

In one particular configuration, the optomechanical structure can be situated in a fluid whose density is to be determined. In this case, the alteration of the resonant frequency can serve as a measurement variable for the determination of the density of the fluid. The shape of the optomechanical structure can be modulated periodically with a known frequency, such that the optical resonator and thus the optical sensor signal can also be altered periodically. The signal can be separated from possible interference signals by means of a filtering with the known modulation frequency. As a result of an alteration of the excitation frequency of the actuator signal and simultaneous metrological detection of the sensor signal, it is possible to determine the resonant frequency dependent on the density of the fluid. Furthermore, a multiplicity of optomechanical structures having different shapes can be used in order to determine further properties of the fluid or in order that physical variables such as density or viscosity, both of which can have an influence on the resonance, can be differentiated from one another. In this embodiment, the optomechanical structure can additionally be constituted in such a way that dynamic properties, such as the flow rate of the fluid, can also be detected therewith. Furthermore, the optical resonator situated between the optomechanical structure and the optical subsystem can be used for characterizing the fluid. In this configuration, the optomechanical structure can be designed in particular for operation in a liquid. The design here can be distinguished by the fact that the resonant frequency is only slightly dependent on the viscosity of the fluid surrounding it. The design can be dictated for example by a shape of the optomechanical structure which dictates a high stiffness and/or small interaction with the fluid.

In one particularly preferred configuration, the optical subsystem can have at least one optical coupling point configured for input coupling and/or for output coupling of the optical actuator signal and/or of the optical sensor signal. In this case, the input coupling and/or the output coupling of the optical actuator signal and of the optical sensor signal can be implementable at one and the same optical coupling point or, preferably, at at least two separate optical coupling points. In the present context, the term "optical coupling point" describes a partial region of the optical subsystem through which light can impinge on the optomechanical structure and/or through light emitted or backscattered by the optomechanical can be received. This can involve e.g. an optical exit or entrance facet of an optical fiber, of an integrated optical waveguide, or more complex emission structures such as e.g. optical grating couplers, directional couplers, tapered waveguides or the like. Further examples of optical coupling points encompass light exit and entrance facets of surface-emitting components such as e.g. vertically emitting lasers (referred to as Vertical-Cavity Surface Emitting Lasers, VCSEL) or photodetectors. Optical coupling points can also be present in the form of large-area transparent substrates such as glass laminae or exit windows of lithography objectives, for example, on which the optomechanical structure can be anchored. An accuracy with which the optomechanical structure is producible relative to the at least one optical coupling point can be set to at least 500 nm, preferably to at least 100 nm, particularly preferably to at least 50 nm, by means of the present method.

In a further aspect, the present invention relates to a method for producing a micro-optomechanical system. In this case, the method according to the invention comprises the following steps a) and b), which are preferably carried out in the order indicated, wherein the two steps can at least partly be performed simultaneously:

a) providing at least one optical subsystem, wherein the optical subsystem is configured for emitting at least one optical actuator signal and for receiving at least one optical sensor signal; and b) producing at least one optomechanical structure in direct contact with the optical subsystem by means of a direct writing microstructuring method in such a way that at least one optomechanical actuator element and at least one optical sensor element are produced in the optomechanical structure, wherein the optical actuator signal in interaction with the optical actuation element is configured for changing a mechanical state of the optomechanical structure, and wherein the optical sensor signal in interaction with the optical sensor element is configured for detecting the change in the mechanical state of the optomechanical structure or a variable related thereto.

According to the invention, the optomechanical structure is produced with the aid of a direct writing microstructuring method. As already mentioned, the term "direct writing microstructuring method" denotes a method which can convert a structure present in the form of a data set into a physical structure without employing a static mask or mask produced beforehand. The direct writing microstructuring method used here can preferably be selected from a lithographic method or an additive method, in particular from a group comprising direct writing ultraviolet lithography, electron beam direct writing, two-photon polymerization, stereolithography and inkjet printing. In this case, the direct writing microstructuring method used can make use of additive or subtractive structuring methods. In one particularly preferred embodiment, this can involve two-photon lithography, which is used in conjunction with a negative or positive photoresist.

If a negative photoresist is used, absorption of two photons is brought about at the focal point (focus) of a pulsed laser having a high peak intensity, which absorption brings about a chemical alteration of a photoresist (referred to as resist). By means of exposure of the desired structure, curing of the desired structure can be effected as a result. In a further step, which is also referred to as a development step, a non-exposed portion of the photoresist can be removed, in particular by the unexposed material being rinsed away, with the result that only the desired, exposed structure remains. In particular, different wavelengths and resists can also be used, for example UV light, fs pulses of 400 nm to 1700 nm, for instance at 1550 nm, 1030 nm or 500 nm. In this case, the different wavelengths can in particular also be used in the same device. In this regard, UV light can be used for such partial regions of the optomechanical structure which have a high volume, but only minor requirements in respect of the resolution, and/or which are situated in direct proximity to an optical subsystem.

In the case of a positive photoresist, the method is configured such that only the exposed structure is dissolved and the residue that remains is maintained in a subsequent development step, for which purpose a suitable resist material is used. Structures with any desired shape can be produced by means of the production method described. In particular, it is possible to produce structures which are configured to influence (modify) the mode field diameter of light beams in virtually any manner desired, which structures are referred to here as beam-shaping elements.

In one preferred configuration on the basis of direct writing laser lithography, in this case the optomechanical structure to be produced could firstly be divided into planes, wherein the planes can be arranged preferably at a distance of 20 nm to 500 nm, particularly preferably of 40 nm to 200 nm, in particular of 50 nm and 150 nm, with respect to one another. The planes can be described in particular by lines having a distance of preferably 20 nm to 500 nm, particularly preferably of 40 nm to 200 nm, in particular of 50 nm to 150 nm. Ends and beginnings of the lines can be described by Cartesian coordinates in a data set. Other modes of representation are possible, however, for instance on the basis of cylindrical coordinate systems. A three-dimensional direct writing laser lithography system can scan the corresponding lines and produce a three-dimensional structure in this way. Alternatively, it is possible to employ writing strategies which are adapted to the shape of the optomechanical structure and in which, for example, writing lines are preferably guided parallel to the surface of the optomechanical structure in order to prevent a formation of stepped structures on a surface of the optomechanical structure. In particular, the writing speed, and thus the accuracy, of individual partial regions of the optomechanical structure can be adapted. In particular, it is also possible to use a writing method with a variable speed within the structure to be produced, wherein the laser power can be adapted dynamically to the writing speed.

As an alternative to direct writing lithography methods, other additive manufacturing methods that allow the production of three-dimensional freeform structures with a high resolution can also be used for producing the optomechanical structure. They include, for example, other lithography methods such as e.g. electron beam lithography or stereolithography or else high-resolution printing methods such as e.g. inkjet printing. In this case, the resolution of the direct writing structuring can preferably be better than 20 µm, particularly preferably better than 5 µm, and very particularly preferably better than 1 µm, in all three spatial directions.

Step b) can be performed using a direct writing laser lithography method in particular as follows:

(α) Mounting of the optical subsystem in the lithography system and measurement of its position relative to the coordinate system of the lithography system. For this purpose it is possible to use in particular alignment marks on the surface of the optical subsystem. In this case, structures that typically are already present and fulfil a further purpose, such as e.g. a waveguide to be linked optically or a coupling structure, can also serve as alignment markers. The alignment marks can preferably be detected by means of an imaging method, in particular a camera-based method. By way of example, confocal imaging methods can also be used for detecting the alignment marks in three dimensions. It is possible, in particular, to use parts of the optical beam path of the lithography system both for detecting the alignment marks and for exposing the optomechanical structure to be produced. The alignment markers can also comprise illuminated fiber cores, in particular. Furthermore, the alignment markers can also comprise waveguides illuminated by the lithography system.

(β) Production of the designed optomechanical structure in a local coordinate system of the optical subsystem. In this case, the optomechanical structure can be fixedly connected to the respective associated optical subsystem. In this case, the positioning accuracy with which the optomechanical structure can be produced on the optical subsystem can be preferably better than 10 µm, particularly preferably between than 2 µm, in particular better than 500 nm. In order to achieve this positioning accuracy, it is possible to use alignment marks which are fitted on the optical subsystem and the relative position of which in relation to the coupling points of the optical subsystem is known very accurately, wherein the accuracy is preferably better than 10 µm, particularly preferably better than 2 µm, in particular better than 500 nm. These alignment marks can be detected with high accuracy during the lithography step, wherein the accuracy is preferably better than 10 µm, particularly preferably better than 2 µm, in particular better than 500 nm. The optomechanical structure can be produced directly at or on the optical subsystem. Alternatively, the optomechanical structure can also be produced at or on a mount, which can be fixedly connected to the optical subsystem. In particular, the mount can also be a structure produced by a microstructuring method for three-dimensional structures, in particular two-photon lithography. The production of the mount can be carried out in the same method step as the production of the optomechanical structure or in a step upstream thereof.

The configuration of step b) can optionally provide preparation of the optical subsystem, said preparation including for example a suitable surface modification by means of an adhesion promoter or application of mounts having an anchoring effect. Alternatively or additionally, an intermediate layer can be applied between the optical subsystem and the optomechanical structure, wherein the intermediate layer can serve as a holding structure and/or as an adhesion promoter. In this case, a reflection-reducing or reflection-increasing coating can be applied to at least one surface of the optical subsystem. The coating can in particular also be effected by applying the same resist material of which the optomechanical structure consists. For this purpose, by way of example, a drop of resist can be applied to the optical subsystem and be cured by ultraviolet light. Afterward, further, liquid resist material can be applied and structured in a direct writing method.

In a further configuration, the production of the optomechanical structure can be effected in such a way that the latter are initially produced at a multiplicity of continuous optical subsystems before a singulating step for singulating the optical subsystems for respective further use in one or more optical systems is performed. In this regard, by way of example, it is possible to produce optomechanical structures on surface-emitting components particularly efficiently as long as the components are still present in the form of a wafer that is divided into individual elements only after the writing of the optomechanical structures. Alternatively, the production of the optomechanical structures can be carried out at optical subsystems that have been singulated beforehand but are present in array form.

In a further configuration, measures are taken to increase the dimensional accuracy of the optomechanical structure. Said measures can consist for example in a prior compensation of manufacturing-dictated deviations occurring systematically, or in an aftertreatment of the structure produced. In this case, the aftertreatment can include chemical, optical and thermal methods and also a combination of all the methods.

In a further configuration, the optomechanical structure can be produced on an optical subsystem produced beforehand by replication, such as, for example, micro-optical units produced in the injection molding method, plug systems or optomechanical structures produced in replication.

In one preferred method, a tip comprised by the optomechanical structure can in particular also be produced from a material added in a subsequent step. Subsequent here means after the production of the optomechanical structure. Particularly preferably, a material that is resistant to abrasion and wear can be used here. Particularly preferably, use is made here of a material, a material arrangement or a material combination which has a small tip radius and/or which has a decreasing tip radius during a mechanical contact with a sample ("self-sharpening"). Furthermore, the tip can have plasmonic resonances or be a diamond or be a diamond having a nitrogen valance (referred to as nitrogen vacancy diamond defects, NV centers). In an alternative method for producing the optomechanical structure supplemented by a tip, the tip can be produced in the same production step as the optomechanical structure. In one preferred method for producing an aperture at the tip, the optomechanical structure can be coated with metal, for example by vapor deposition or sputtering. The aperture can subsequently be opened by means of a subtractive microstructuring method. Alternatively, the tip can also be brought into mechanical contact with a sample, such that an opening of the metal layer at the tip can arise as a result of the tip-sample interaction.

For further details with regard to the present method for producing a micro-optomechanical system, reference is made to the rest of the description of the micro-optomechanical system. In particular, particular configurations described therein are also producible by the present method.

Advantages of the Invention

The present invention has a series of advantages over the methods and optical systems known from the prior art. One major advantage of the present method concerns the universal applicability thereof. By means of a three-dimensional direct writing lithography method or a comparable high-resolution additive manufacturing method, it becomes possible to produce micro-optomechanical structures having virtually any desired shaping with very high resolution. As a result, it is possible to provide optomechanical structures for a wide range of applications. Moreover, even very complex optomechanical systems can be realized since there are few production-dictated limitations in respect of the shaping. Furthermore, a high flexibility of the optomechanical structure is afforded. The latter can be adapted for example with regard to its mechanical resonant frequency, mechanical spring constant and its optical properties in a manner governed by the shaping. In particular, it is also possible to alter the optomechanical structure by means of a signal of the optical subsystem, which has the effect that the optomechanical freeform structure can always be operated at the ideal operating point.

Furthermore, it is possible to adapt the optomechanical structure to the optical subsystem, which is important for example if an optical resonator is intended to be present between the optomechanical structure and the optical subsystem. In some cases, production with the aid of a direct writing fabrication method additionally results in high reproducibility, which has a positive effect on fabrication-dictated variation of the dimensional accuracy and also optical and mechanical properties of the systems and structures realized.

The optomechanical structure can be influenced with regard to its mechanical shape by means of an optical actuator signal proceeding from the optical subsystem (optomechanical excitation). Furthermore, by means of an optical sensor signal likewise proceeding from the optical subsystem, the mechanical state, in particular shape, position, bending and/or torsion, of the optical structure can be detected metrologically by the optical subsystem by virtue of the optical sensor signal being coupled into the optical subsystem again. Furthermore, the optomechanical structure can be acted on by an optical actuator signal proceeding from the optical subsystem, which can interact with the surroundings of a sample and/or the surrounding medium or can be coupled into the respective sample again and optionally be coupled into the optical subsystem again. Furthermore, material properties of the optomechanical structure or the position of the optomechanical structure can thus be altered.

The present invention thus achieves the object of integration of conventional micro-optical components and systems, such as lasers, optical chips (PICs), fibers or fiber plugs, with sensor-actuator optomechanical structures to form an overall micro-optomechanical system. In this case, "integrate" is understood to mean an inseparable, compact connection. The overall system is thereby able to cope with a multiplicity of metrological objectives such as the high-resolution measurements of topographies, optical near fields, properties of liquids or accelerations. It can furthermore enable the influencing of optical signals proceeding from optical subsystems and optical components. It can exhibit both the possibility of an optical actuation and the detection of a mechanical state variable. In particular, corresponding embodiments can be suitable for operation in vacuum, in air and also in fluids. This requirement necessitates that parameters such as spring hardness and also shape of the optomechanical system can be adapted to the respective measurement environment. It may also be possible, in particular, to adapt the optomechanical structure in an application-specific manner, such that individual pieces can be produced cost-effectively in a very flexible production method. Furthermore, an automated, reproducible and scalable production process can be made possible.

The in-situ production of the optomechanical structure at or on the optical subsystem according to the invention has, in particular, the advantages presented below. In this regard, subsequent mounting of a structure is not necessary since the latter is produced at the site of its use. In this context it is possible, in order to increase the precision in the construction of the system, to have recourse to markings on the surface of the optical subsystem. A high precision of the proposed production method and the possibility of aligning the optomechanical structure already during production directly at markings on the optical subsystem can result in an inherent high positioning accuracy of the optomechanical structure relative to the optical subsystem to be connected. This is the case particularly if the optical system used for measuring the position of the optical subsystem is the same as that used for carrying out the lithography. Thus the present method is in particular also suitable for single-mode components having small mode field diameters. Use of a three-dimensional direct writing lithography method additionally makes it possible to produce optomechanical structures having virtually any desired shapes, such that the present invention has a wide field of use.

BRIEF DESCRIPTION OF THE FIGURES

Further details and features of the present invention are evident from the following description of preferred exemplary embodiments, particularly in conjunction with the dependent claims. In this case, the respective features can be realized by themselves or as a plurality in combination with one another. The invention is not restricted to the exemplary embodiments.

The exemplary embodiments are illustrated schematically in the following figures. In this case, identical reference numerals in the figures designate identical or functionally identical elements or elements that correspond to one another with regard to their functions. Specifically in the figures.

DESCRIPTION OF THE EXEMPLARY EMBODIMENTS

Figure 1:
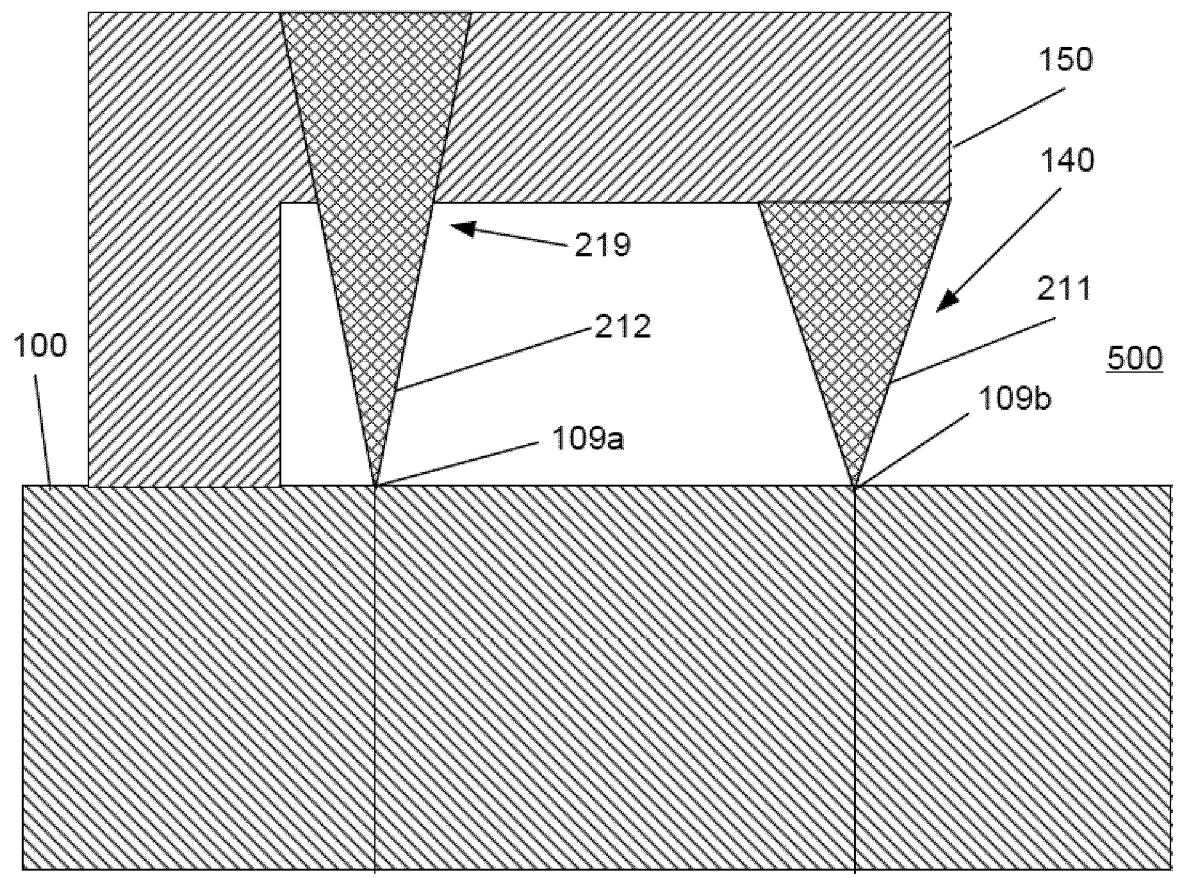
FIG. 1 shows a schematic illustration of one exemplary embodiment of an optomechanical structure, producible on an optical subsystem.

FIG. 1 shows an exemplary illustration of an optical subsystem 100 supplemented by an optomechanical structure 150. The optical subsystem 100 is configured to emit an optical actuator signal 212 at one of its coupling points 109a, which optical actuator signal can mechanically influence the optomechanical structure 150 by means of an actuator element 219. The optical subsystem 100 is furthermore configured to receive an optical sensor signal 211 at a further coupling point 109b. In this case, a mechanical alteration of the optomechanical structure 150 can be detected by means of an optomechanical sensor element 140. In a further embodiment (not illustrated), the optical actuator signal 212 and the optical sensor signal 211 can be emitted and received at the same coupling point 109a or 109b.

Figure 2:
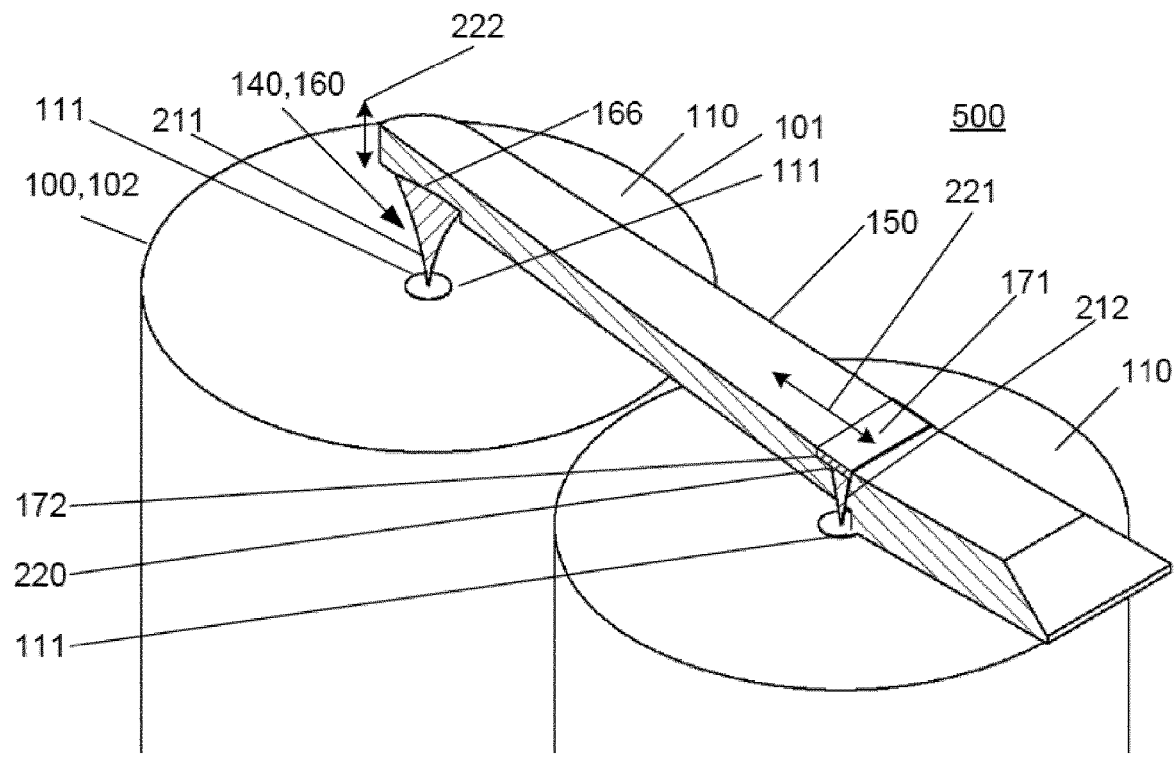
FIG. 2 shows a schematic illustration of one exemplary embodiment of an optomechanical structure, producible on a facet of an optical fiber.

FIG. 2 shows one particularly preferred embodiment of the optical subsystem 100 supplemented by the optomechanical structure 150. For illustration purposes, the optomechanical structure 150 has been cut away, the sectional area being illustrated by a hatching. The optical sensor signal 211 radiates through an optical waveguide 111 into the optical sensor element 140, which is designed as an optical resonator 160 by way of example in FIG. 2. In this exemplary embodiment, the optical resonator 160 forms between a facet 110 of the optical subsystem 100 and a freeform mirror 166. One particularly preferred configuration of the resonator 160 may be found in FIG. 5. The optical actuator signal 212 impinges on the surface of the optomechanical structure 150 through the optical waveguide 111, as a result of which heating is brought about at a location 220 including the surroundings thereof. In order to intensify the heating, the optomechanical structure 150 can optionally be provided with a coating 171, which can be suitable for converting the optical actuator signal 212 directly into a movement 222 or for indirectly fostering a conversion of the optical actuator signal 212 into the movement 222. By way of example, stresses 221 can form as a result of a thermal expansion, which stresses can lead to the movement 222 of the optomechanical structure 150. In this case, the coating 171 can extend over a part of the surface of the optical structure 150 or completely cover the surface of the optical structure 150. Optionally, a second partial region 172 of the optomechanical structure 150 can be constituted in such a way that it fosters the movement 222. The movement 222 can be achieved, in particular, by virtue of the fact that at least one material in the second partial region 172 has a different coefficient of thermal expansion or light absorption coefficient than the rest of the optomechanical structure 150. Alternatively or additionally, this can also involve a structure smaller than the light wavelength of the light radiated in with the optical actuator signal 212, which structure, as a result of a high power of the light radiated in with the optical actuator signal 212, can at least partly carbonize and thus have a greatly absorbing effect. Alternatively or additionally this can furthermore involve a structural alteration or reordering of the second partial region 172 or an orientation of at least one material in the second partial region 172 at the molecular, microscopic or atomic level, which is accompanied by impingement of light of the optical actuator signal 212, in particular an occurrence of a phase transition associated with a change in linear expansion, a photothermal reaction or a phase transition of a liquid crystal monomer upon impingement of light or heat. In the exemplary embodiment in accordance with FIG. 2, the above-described reaction can result in the stress 221 which can bring about the movement 222. The movement 222 can be detected by the optical sensor element 140. For this purpose it is possible to use, in particular, the optical resonator 160 illustrated schematically in FIG. 2, the functional principle of which can advantageously be based on interference of reflections at the facet 110 and the freeform mirror 166.

Figure 3:
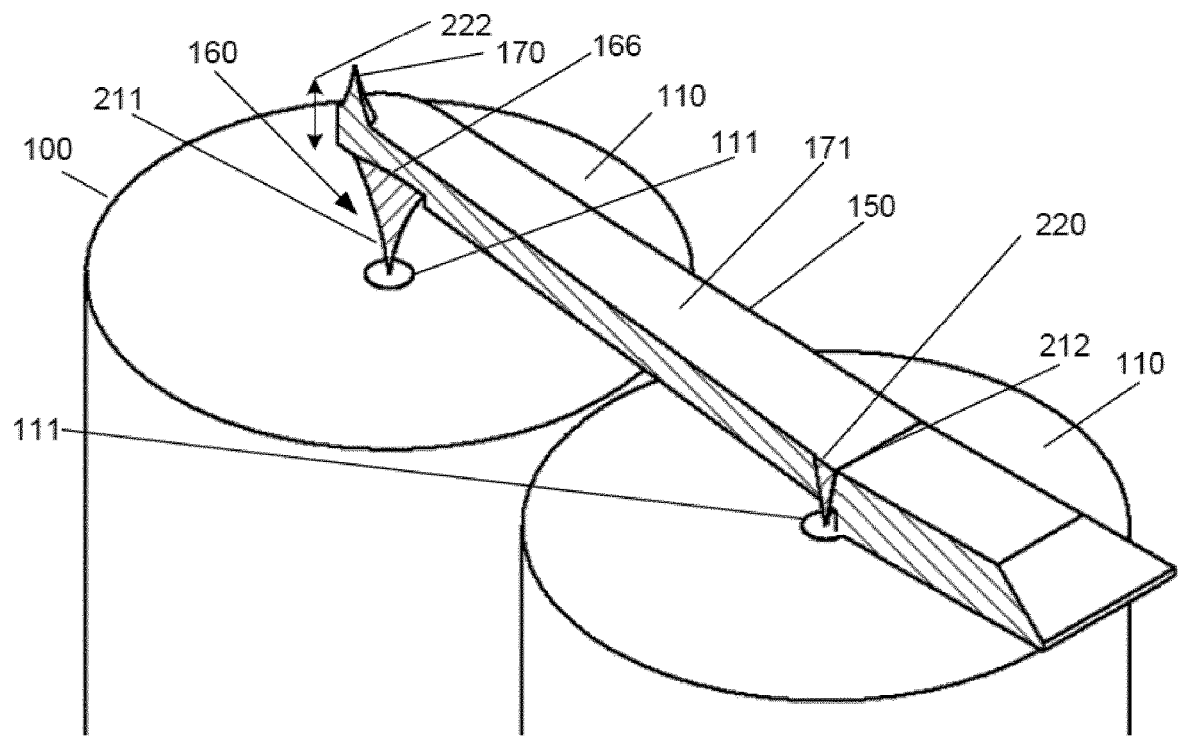
FIG. 3 shows a schematic illustration of one exemplary embodiment of an optomechanical structure, producible on the facet of an optical subsystem; preferably suitable for AFM measurements.

In FIG. 3, the optomechanical structure 150 has been supplemented by a tip 170, which, in one preferred embodiment, comprises the same material as the optomechanical structure 150 and, particularly preferably, was produced during the same production step as the optomechanical structure 150. By virtue of the tip 170, the optomechanical structure 150 can be suitable for AFM measurements, in particular. In a further preferred embodiment, the tip 170, in comparison with the optomechanical structure 150, can comprise a material having a higher abrasion resistance, having a smaller tip radius and/or in a self-sharpening arrangement.

Figure 4:
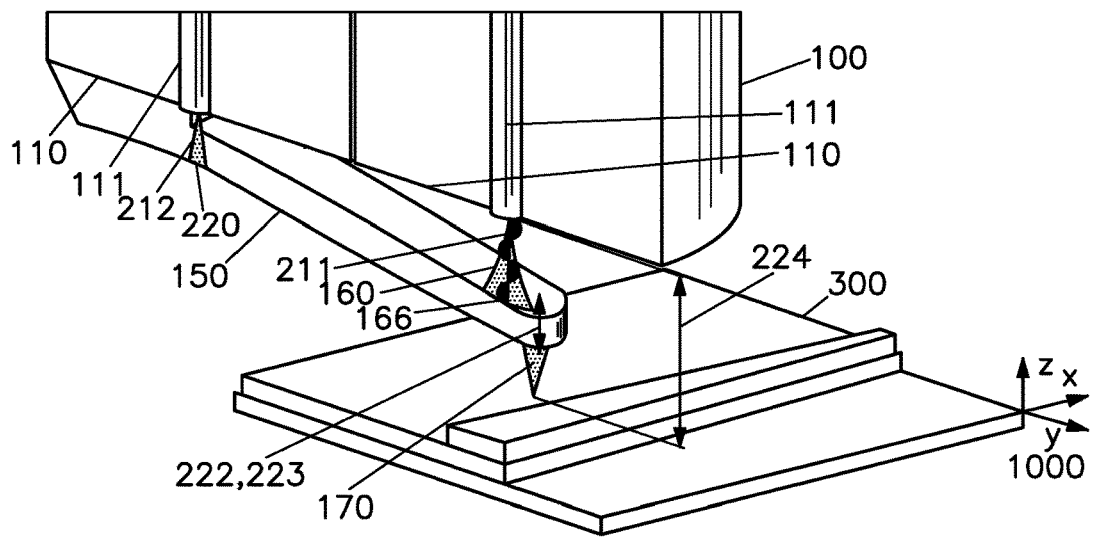
FIG. 4 shows a schematic illustration of an AFM measurement using the optomechanical structure from FIG. 3.

A further preferred exemplary embodiment is shown in FIG. 4. In this case, the tip 170 is brought in proximity to a sample 300 to be examined, wherein the term "sample" denotes an object to be examined. The sample 300 can be scanned by means of relative movements of the sample 300 with respect to the tip 170 in an xy-plane, defined here by a coordinate system 1000. Furthermore, a movement 222, 223 of the tip 170 which forms on account of bending of the optomechanical structure 150 by the sample 300 can be detected by the optical resonator 160. In this case, the movement 223 can represent the topography of the sample 300 as a function of the xy-coordinate. In a further, preferred embodiment, a z-distance 224 between the sample 300 at a contact point between the tip 170 and the sample 300 can be regulated by the optical subsystem 100 such that the z-distance 224 remains constant. A regulation signal or a signal quantifying this regulation can represent the topography of the sample 300 as a function of the xy-position. In a further particularly preferred embodiment, the optical actuator signal 212 can mechanically influence the structure at the location 220 in such a way that it oscillates as a function of the amplitude represented by the movement 222. A variation of the optical actuator signal 212 that is sinusoidal with respect to time can preferably be used for this purpose. In this case, the size of the movement 222 can be determined both by the amplitude of the optical actuator signal 212 and by the frequency of the optical actuator signal 212, the movement 222 being all the larger, the nearer the frequency of the optical actuator signal 212 is to the resonance of the optomechanical structure 150. An excitation frequency of the optical actuator signal 212 that is near the resonance of the optomechanical structure 150 is preferred. Preferably, during a raster scanning movement 223 of the sample 300 relative to the optomechanical structure 150, the z-distance 224 can be regulated in such a way that the amplitude is preferably at most 60%, particularly preferably at most 75%, in particular at most 90%, of the amplitude 222 without contact between the tip 170 and the sample 300. Here, too, the regulating signal for the z-distance 224 can again represent a topography of the sample 300 as a function of the xy-position. In a further particularly preferred embodiment, the optical actuator signal 212 can be used to influence the resonant frequency of the structure 150 by means of heating 220, wherein heating can mean a lower resonant frequency. The resonant frequency can be set accurately as a result. In a further, particularly preferred embodiment, the optical actuator signal 212 can be used to control the movement 222 by means of the heating 220 in such a way that the amplitude of the movement 222 during the scanning of the sample in the xy-plane remains constant, wherein the optical actuator signal 212 or portions of its frequency component represent a topography of the sample 300 as a function of the xy-position. In particular, the optical actuator signal 212 can also regulate the force with which the tip 170 presses on the sample 300 in such a way that it remains constant.

Figure 5:
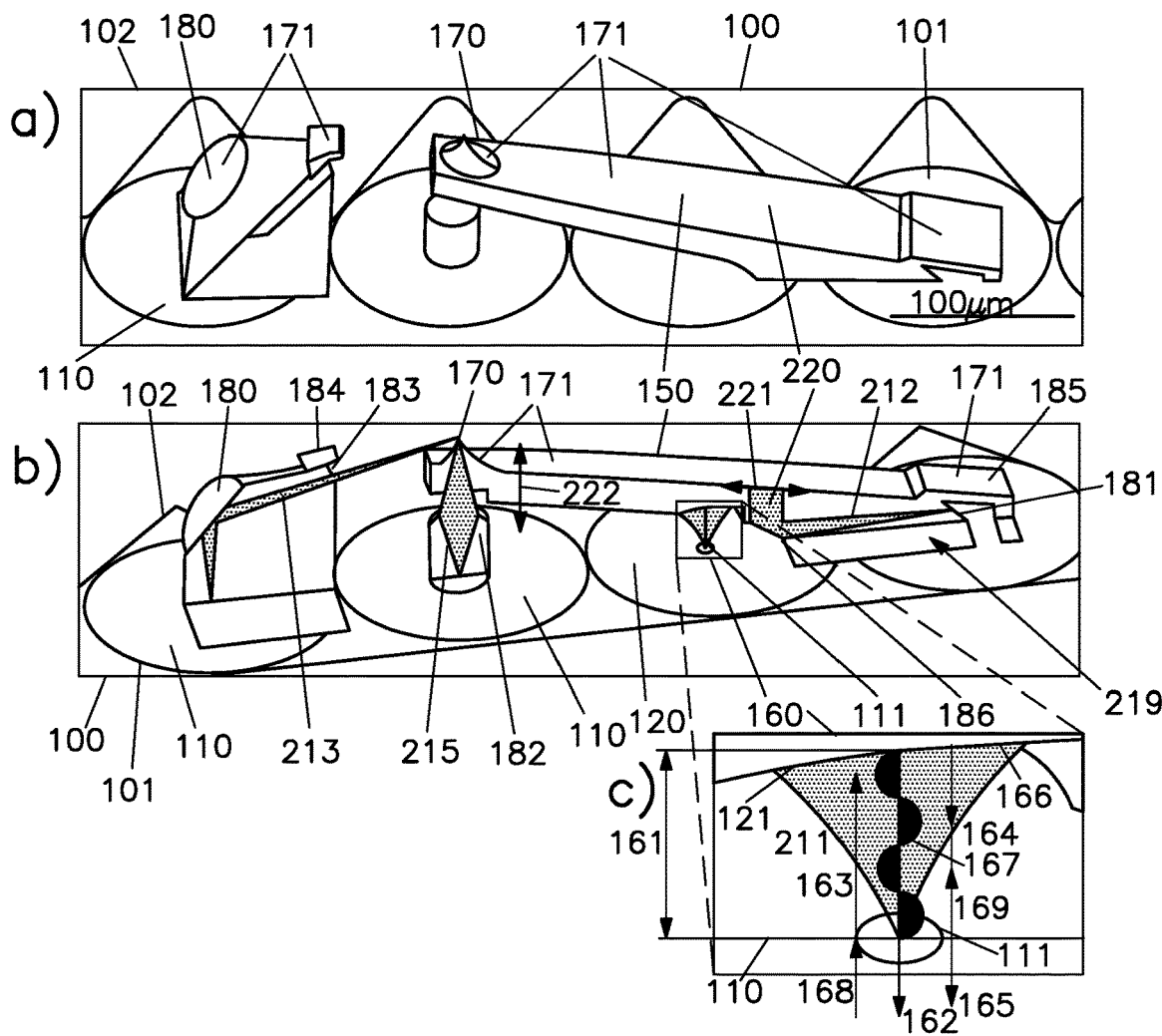
FIG. 5 shows a schematic illustration of one exemplary embodiment of an optomechanical structure, producible on the facet of an optical subsystem, preferably suitable for simultaneous AFM and SNOM measurements.

FIG. 5 illustrates a further, particularly preferred exemplary embodiment in which the optical subsystem 100 is embodied by an array 102 of single-mode fibers 101. In this case, FIG. 5A illustrates a scanning electron micrograph, while FIG. 5B shows a schematic illustration of the same embodiment. The optomechanical structure 150 is designed as a cantilever here as well, wherein the actuator element 219 has two mirrors 181, 186, which divert the optical actuator signal 212 in such a way that they can heat the location 220. In this case, the two mirrors 181, 186 can be protected by the coating 171, wherein this can be provided automatically for the mirror 186 on account of the position of the mirror 186, while the mirror 181 can be protected by a shielding structure 185. Both mirrors 181, 186 here function by the principle of total internal reflection. For this reflection principle, the advantage over reflection at a metal layer is afforded whereby even high powers and/or intensities can be used, since the metal can bring about great heating, whereby in particular thermal destruction of the mirror 181 can occur, since here the power density of the optical actuator signal 212 is very high. Metallic coatings can also be used at lower intensities, however. Furthermore, a freeform lens 182 is situated on the facet 110 in the embodiment in accordance with FIG. 5, said freeform lens being suitable for coupling light from the tip 170 into the optical subsystem 100 in the form of the optical actuator signal 212. In one particularly preferred embodiment, here it is possible to interrupt the coating 171 of the cantilever at the tip 170 in the form of a, for example circular, aperture. The aperture preferably has a diameter of less than 500 nm, particularly preferably of less than 250 nm, in particular of less than 50 nm. In a further, preferred embodiment, the optical subsystem 100 can provide a third optical signal 213, which can laterally illuminate the tip 170 or emerge through the apex of the tip 170. In this case, the signal 213 can be provided by a partial region of the optomechanical structure, which can comprise a freeform mirror 180 and a freeform lens 183. In this case, the freeform lens 183 can be protected against inadvertent vapor deposition by means of a shielding structure 184.

FIG. 5C shows one particularly preferred embodiment of the optical resonator 160 in which the optical sensor signal 211 can be reflected between a freeform mirror 166 and the facet 110. In this case, the resonator 160 can comprise light 168 which impinges on the facet 110 and which is provided by the optical subsystem 100. A portion 163 of the light can be transmitted by the facet 110 and be reflected at the freeform mirror 166 with a portion 164. A portion 165 of the light transmitted by the facet 110 of the optical subsystem 100, which light was previously reflected at least once at the optomechanical structure 150 as the portion 164, can couple into the waveguide 111 of the optical subsystem 100, while a further portion 169 can be reflected there in order to pass through the optical resonator 160 repeatedly such that the portion 165 of the light can be coupled in repeatedly. Furthermore, all portions 162, 165 of the light can interfere at a detector, in particular a photodiode 414 from FIG. 12. For many applications, the largest possible quotient of measured intensity for destructive and constructive interference may be desirable for this purpose. Said quotient is a maximum when the sum of all amplitudes of the portions 165 of the light are equal to that of the amplitude all portions 162 of the light. This can be brought about by means of a suitable shape of the freeform mirror 166, of a suitable coating 121 of the freeform mirror 166 and also of a suitable coating 120 of the facet 110, and also by a choice of a length 161 of the optical resonator 160 and of a constitution of the waveguide 111 at the facet 110. For further applications, it may be desirable that, in the event of an alteration of the wavelength of the optical sensor signal 211, the greatest possible alteration of the interference of the portions 162, 165 of the light can take place at the detector, in particular the photodiode 414. For this purpose, either the length 161 of the optical resonator 160 can be chosen to have such a magnitude and/or the optical sensor signal 211 passes through the optical resonator 160 as many times as possible, which is adjustable by means of the freeform surface 166, the coating 121 thereof and the coating 120 of the facet 110 and the constitution of the waveguide 111 at the facet 110. It may also be desirable for the optical sensor signal 211 to pass through the optical resonator 160 as frequently as possible in order to bring about the highest possible sensitivity of the interference between the portions 162, 165 in the case of an alteration of the length 161 of the optical resonator 160, which can be caused in particular by the movement 222.

Figure 6:
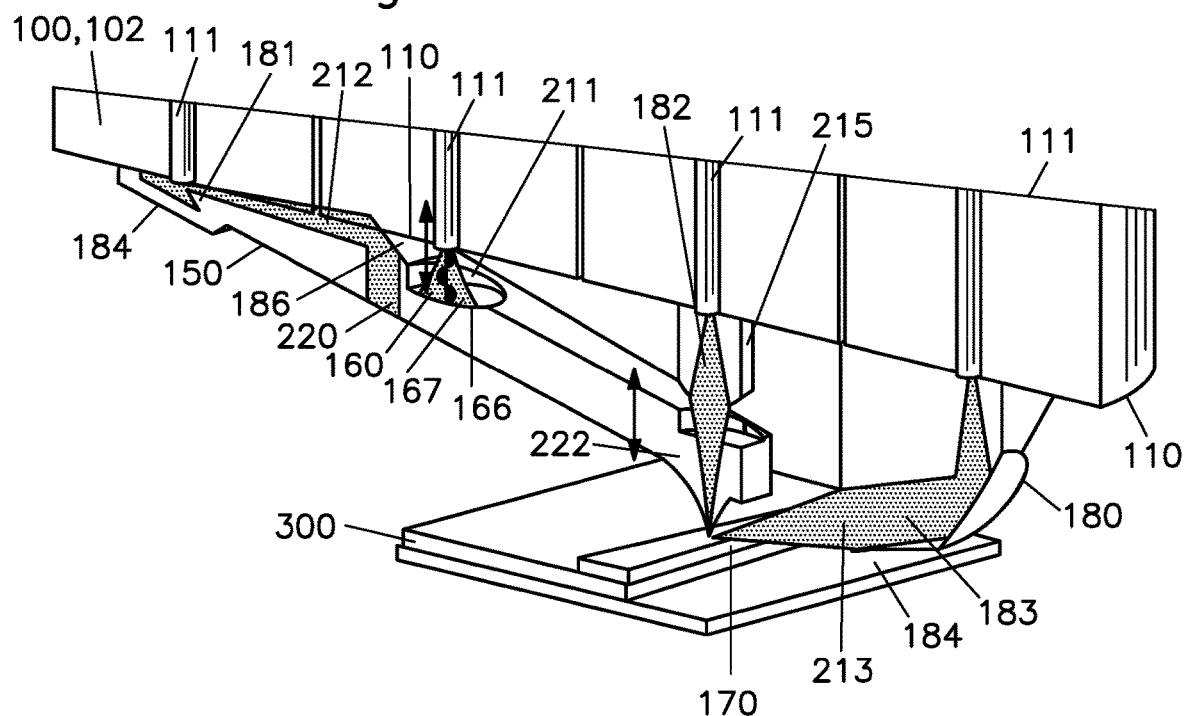
FIG. 6 shows a schematic illustration of an SNOM measurement using the optomechanical structure from FIG. 5.

FIG. 6 shows a use of the embodiment in accordance with FIG. 5 for the spatial measurement of the sample 300. In this case, the topography of the sample 300 can be detected analogously to the explanation with respect to FIG. 4. Alternatively or additionally, however, the tip 170 can be illuminated with the third optical signal 213, such that optical information about the sample 300 can also be obtained as a result of an interaction with the third optical signal 213 at the apex of the tip 170, which information can be coupled into the waveguide 111 of the optical subsystem 100 by way of the optical signal 215. In a further embodiment, the tip 170 can be illuminated in its interior by means of the reversal of the optical signal 215. The light scattered at the tip 170 or the light emitted through an aperture at the apex of the tip 170 can be collected after interaction with the sample 300 in the form of the third optical signal 213, which in this case passes from the tip 170 toward the optical subsystem 100. In this case, the polarization of the third optical signal 213 can be altered, such that the type of interaction between the tip 170 and the sample can be altered.

Figure 7:
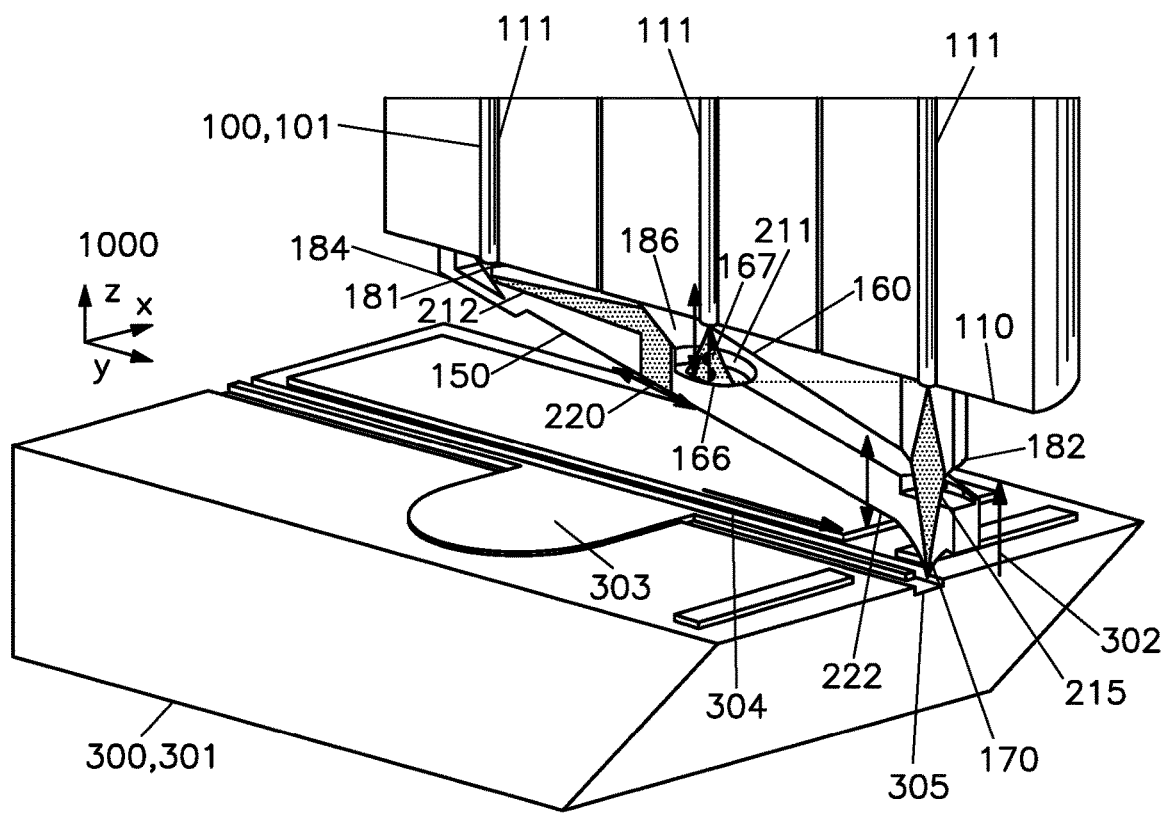
FIG. 7 shows a schematic illustration of an SNOM measurement using the optomechanical structure from FIG. 5 on a laser as active component.

FIG. 7 shows one exemplary embodiment for a measurement of the in a direction 302 of the emitted light (emission direction) of the laser 301 at an exit facet of the laser 301. Said exit facet can be contacted for a measurement at contact pads 303. The resonator 304 of the laser to be measured points in a direction of the arrow indicated in FIG. 7 and is reflected by a mirror 305 in the direction 302. With the embodiment in accordance with FIG. 7, further types of lasers and optical subsystems can also be measured in an analogous way, in particular even those which have no mirror 305. In particular, the laser 301 can be part of a wafer, such that a measurement at the wafer level can be carried out here.

Figure 8:
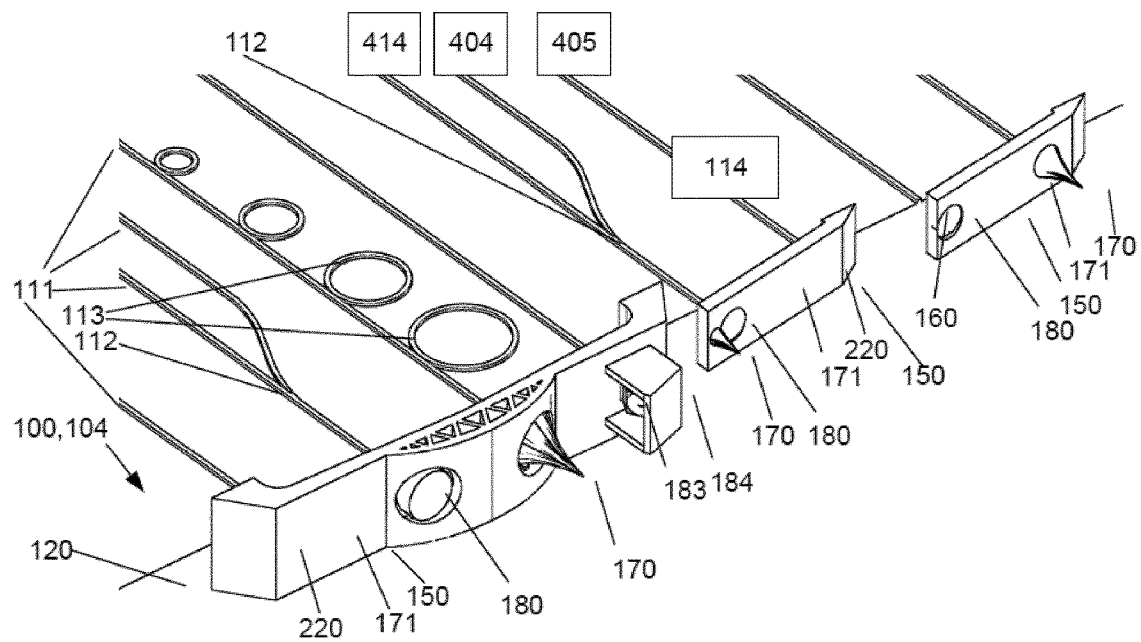
FIG. 8 shows a schematic illustration of one exemplary embodiment of a multiplicity of optomechanical structures, producible on the facets of an optical subsystem; preferably suitable for AFM and SNOM measurements.

FIG. 8 shows a further preferred exemplary embodiment in which a multiplicity of optomechanical structures 150 are present at the facet 110 of the optical subsystem 100, which here is present in the form of an optical chip 104. The optical chip 104 has a multiplicity of optical waveguides 111, filter structures 113, photodiodes 414, sensor lasers 404, actuator lasers 405 and branching junctions 112 of the optical waveguides 111. The lasers 404, 405 and photodiodes 414 either can be produced together with the optical chip 104 or were subsequently connected to the existing optical chip 104. The optical waveguides 111 are configured to influence the optomechanical structures 150 mechanically and to measure their deformation. The optical filter structure 113 can examine the light from the tip 170 with regard to its spectral components. The actuator laser 405 can, as in the present exemplary embodiment, be modulated by means of an optical modulator 114.

Figure 9:
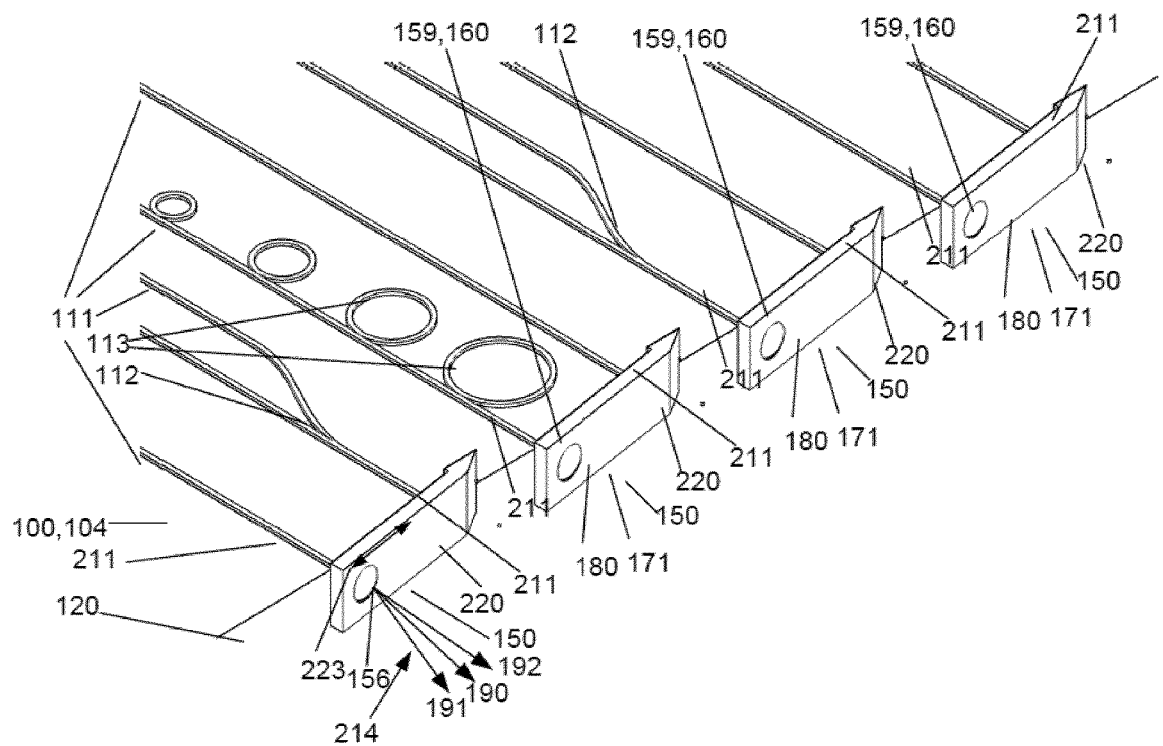
FIG. 9 shows a schematic illustration of one exemplary embodiment of an optomechanical structure, producible on the facet of an optical subsystem; preferably suitable as an integrated optical modulator, filter, phase shifter or beam deflector.

FIG. 9 shows a further preferred exemplary embodiment in which the multiplicity of optomechanical structures 150 are present at the facet 110 of the optical subsystem 100 in the form of the optical chip 104. The optical chip 104 is supplemented here by the optomechanical structure 150 in the form of an optomechanical freeform component designed to deflect light 214 in directions 190, 191 and 192. The light 214 is superimposed on the optical sensor signal 211, an additional signal as in FIG. 11 or identical to the optical sensor signal 211. This effect can be brought about and/or intensified by a suitably shaped structure 156, wherein in any case at least part of the optical sensor signal 211 can be fed back into the optical chip 104 in order to detect the bending of the optomechanical structures 150. A further, particularly preferred embodiment of the optomechanical structure 150 has an optical resonator 159 filled with a lasing medium. As a result, laser light can be emitted in the direction 190 or be coupled into the waveguide 111. For this purpose, the waveguide 111 can have filter structures 113 in order to enable a wavelength-selective amplification to take place, or can have a branching junction 112. As a result of a movement of the optomechanical structure 150 on account of the optical sensor signal 211, the size of the resonator 159 can vary, as a result of which a functionality of a tunable laser can be obtained.

Figure 10:
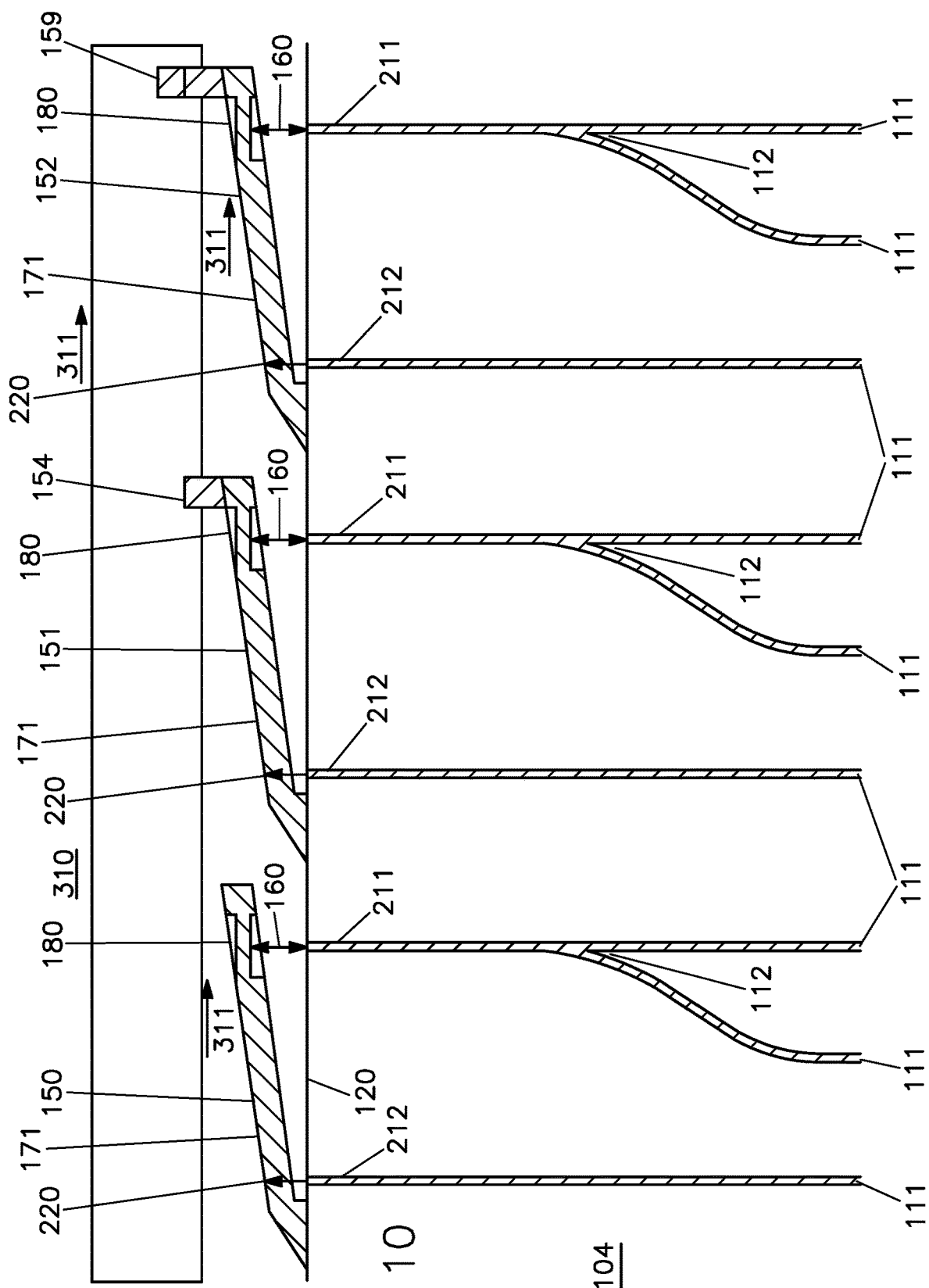
FIG. 10 shows a schematic illustration of one exemplary embodiment of an optomechanical structure, producible on the facet of an optical subsystem; preferably suitable for measuring properties of a liquid.

FIG. 10 shows a further preferred exemplary embodiment of an optomechanical structure 150 which is suitable in particular for a measurement of a movement 311 of a fluid 310 and can simultaneously determine viscosity and density of the fluid 310. For this purpose, various optomechanical structures 150 have different partial structures 154, 159, each of which can cause a different flow resistance. The flow resistance can be manifested in different bendings of the optomechanical structure 150, which can be detected by means of the optical sensor signal 211. By means of different partial structures 154, 159, in this case it is possible to differentiate between parameters such as, for example, viscosity and density of the fluid 310. In particular, for this purpose, the cantilevers can also be excited to effect a resonant oscillation by means of the optical actuator signal 212. In this case, as a result of the different resonant frequencies and dampings of the resonance, it is possible to deduce parameters such as viscosity and density of the fluid 310. Furthermore, the coating 171 can be designed in such a way that specific substances in the fluid 310 can bind selectively to the cantilever, as a result of which the resonant frequency is altered. As a result, preferably, concentrations of specific substances or chemical components occurring in small concentrations can be determined. In addition, the optomechanical structure 150 can be excited to oscillate by means of the optical actuator signal 212, wherein the optical sensor signal 211 are separated from other signals by a filter that effects blocking at frequencies other than the excitation frequency. This can involve a lock-in method, in particular.

Figure 11:
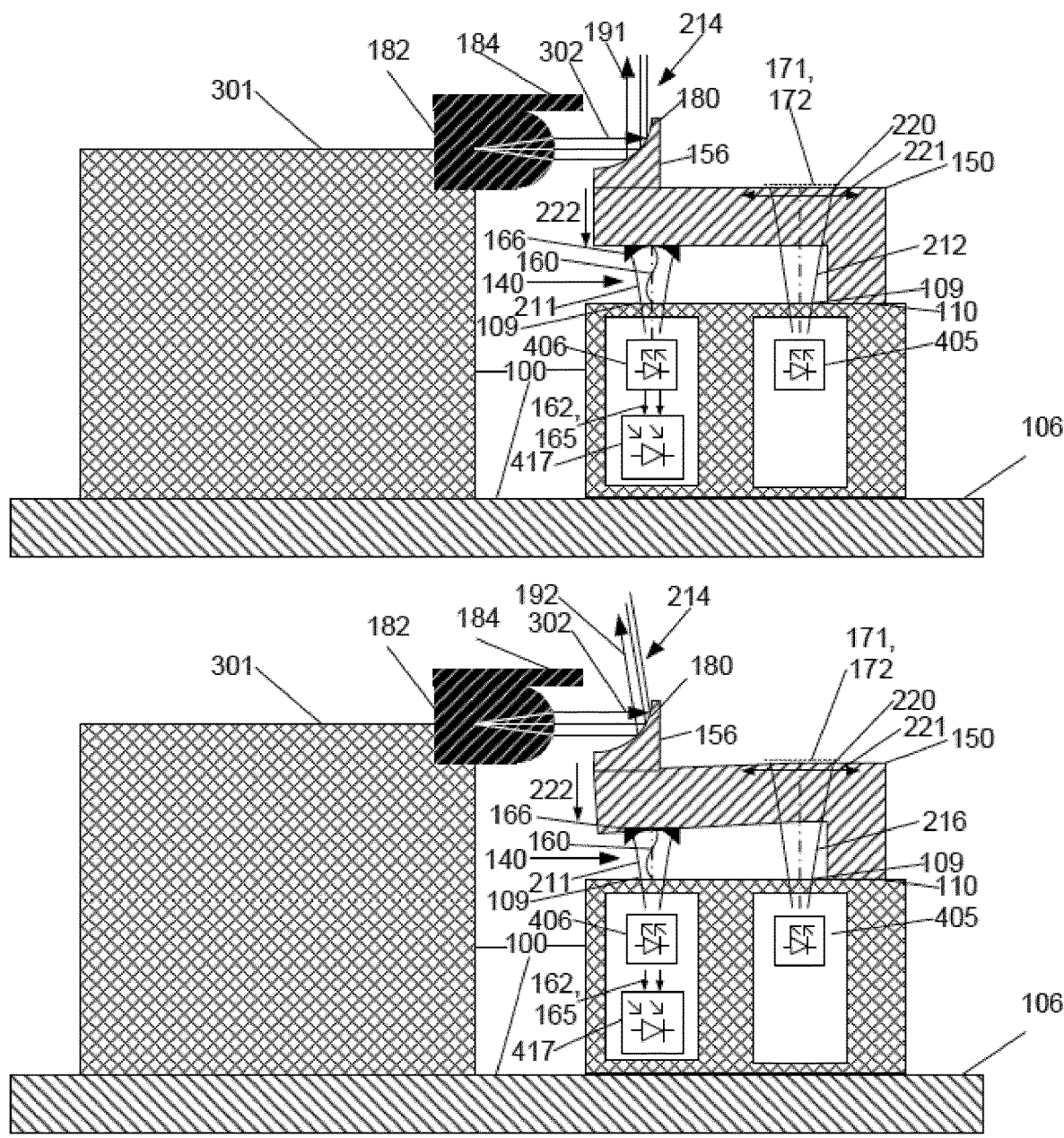
FIG. 11 shows a schematic illustration of one exemplary embodiment of an optomechanical structure, producible on facets of an optical subsystem; preferably suitable as a beam-controlling system.

FIG. 11 shows a further exemplary embodiment in which the optomechanical structure 150 is designed to deflect the light 214 from a laser 301. In this case, the laser can in particular also be part of the optical subsystem 100. In this case, the laser 301 emits in the direction 302, while the optomechanical structure 150 is arranged in such a way that the laser light impinges on it in the direction 302. The laser light in the original direction 302 can be deflected in a direction 191 by the partial structure 156 of the optomechanical structure 150. The laser light can furthermore be deflected in a direction 192 or optionally in further directions by the movement 223. In this case, the partial structure 156 of the optomechanical structure 150 can be constituted in such a way that it fosters this deflection. In particular, the partial structure 156 can be constituted such that an angle of 5° to 60°, particularly preferably of 10° to 45°, in particular of 20° to 30°, occurs between the directions 191, 192. In this case, the movement 223 can be brought about by the heating 220, caused by the optical actuator signal 212, emitted by an emission structure 115, which can preferably be a surface-emitting laser (VCSEL). However, the movement 223 can also be effected in such a way that any desired angle between the directions 191, 192 can be achieved.

Furthermore, the optomechanical structure 150, as is evident from FIG. 11, can be equipped with a position sensor 140. In this case, the position sensor 140 can be configured in such a way that it can enable a direction in which the laser light is emitted to be detected as accurately as possible. In the embodiment in accordance with FIG. 11, for this purpose said position sensor can have an optical cavity which is arranged between the optomechanical structure 150 and the optical subsystem 100 and which can be impinged on by means of an optical sensor signal 211. As a result of interference, different amounts of light 162 can pass to a photodiode 417 in the laser 406, which is designed as VCSEL, for example. The amount of light which is detected by the photodiode 417 in this case can depend in particular on a bending of the optomechanical structure 150. In one particularly preferred embodiment, the photodiode 417 can be integrated into the laser 406. The exemplary embodiment shown in FIG. 11 can be equipped with a tip 170, in particular, instead of the partial structure 156 and can then serve as an AFM.

Figure 12:
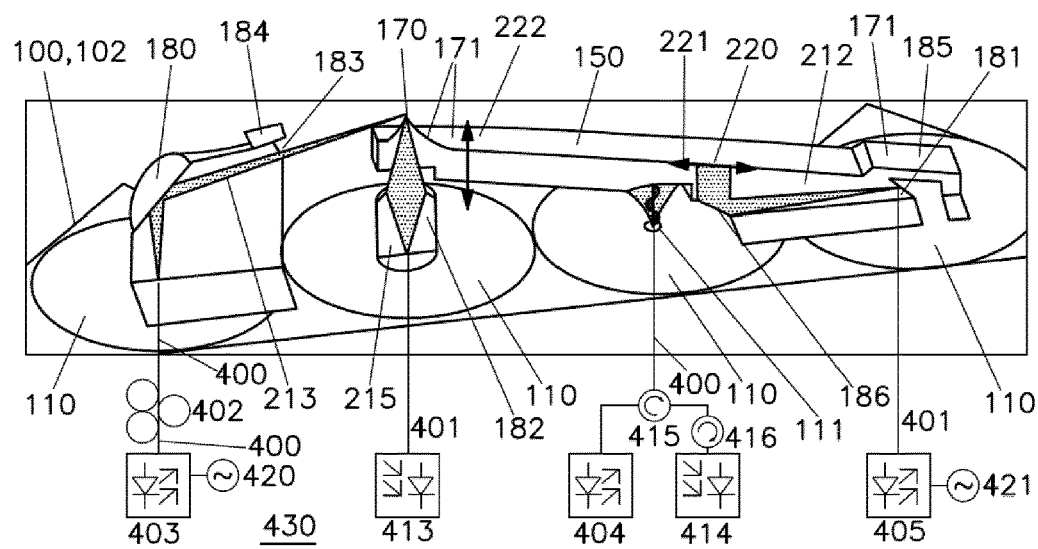
FIG. 12 shows a schematic illustration of one exemplary embodiment having a preferred embodiment of the signal processing.

FIG. 12 shows a metrological implementation of the exemplary embodiment from FIG. 5. Here the optical subsystem 100, a fiber array 102 in the case illustrated, can be connected to an optical signal processing unit 430. Furthermore, the optical waveguides 111 can be present in the form of optical fibers 400, which the facet 110 to further optical components, in particular a fiber-optic polarization controller 402, the lasers 403, 404 and the photodiodes 413, 414. In this case, the fiber-optic polarization controller 402 can be connected to the photodiode 403 by one of the optical fibers 400. Furthermore, a circulator 415 can be connected to one of the optical fibers 400 to the optical facet 110, the laser 404 and the isolator 416 in such a way that the circulator 415 allows light from the laser 404 to pass through to the optomechanical component 150, but not to an isolator 416, while light which arrives from the optomechanical component 150 is allowed to pass through to the isolator 416, but not to the laser 404. The isolator 416 in turn allows light coming from the circular 415 to pass through to the photodiode 414, but not from the photodiode 414 to the circulator 415. Furthermore, the lasers 403, 405 are respectively equipped with a signal generator 420, 421, which can be mutually synchronized. Furthermore, the photodiodes 413, 414 can each be connected to a lock-in amplifier.

Figure 13:
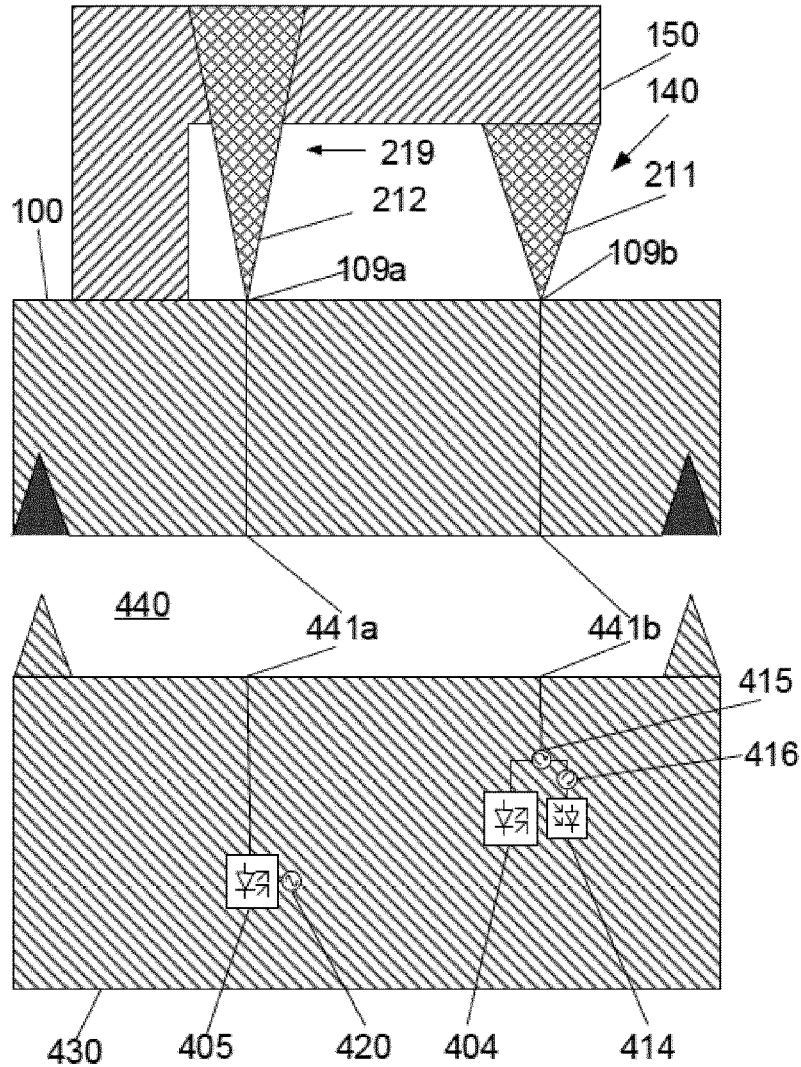
FIG. 13 shows a schematic illustration of one exemplary embodiment in which the optomechanical structure is situated on a pluggable system.

FIG. 13 shows an implementation in which the optomechanical structure 150 is situated on an optical subsystem 100, which can be connected to the optical signal processing unit 430 in a separable manner by means of a releasable connection, in particular a plug connection 440. The plug connection 440 can in particular also comprise fibers 400 as coupling points 441. The plug connection 440 can preferably be a fiber plug which can connect the optical subsystem 100 to the optical signal processing unit 430 at points 431. In particular, this can involve a an MPO (multipath push-on) plug, i.e. a reversible connection configured for optical waveguide plugs, wherein the two plug parts can be aligned with one another by means of pins and holes. Simple exchange of the optical subsystem 100 supplemented by the optomechanical structure 150 can be made possible as a result.

Figure 14:
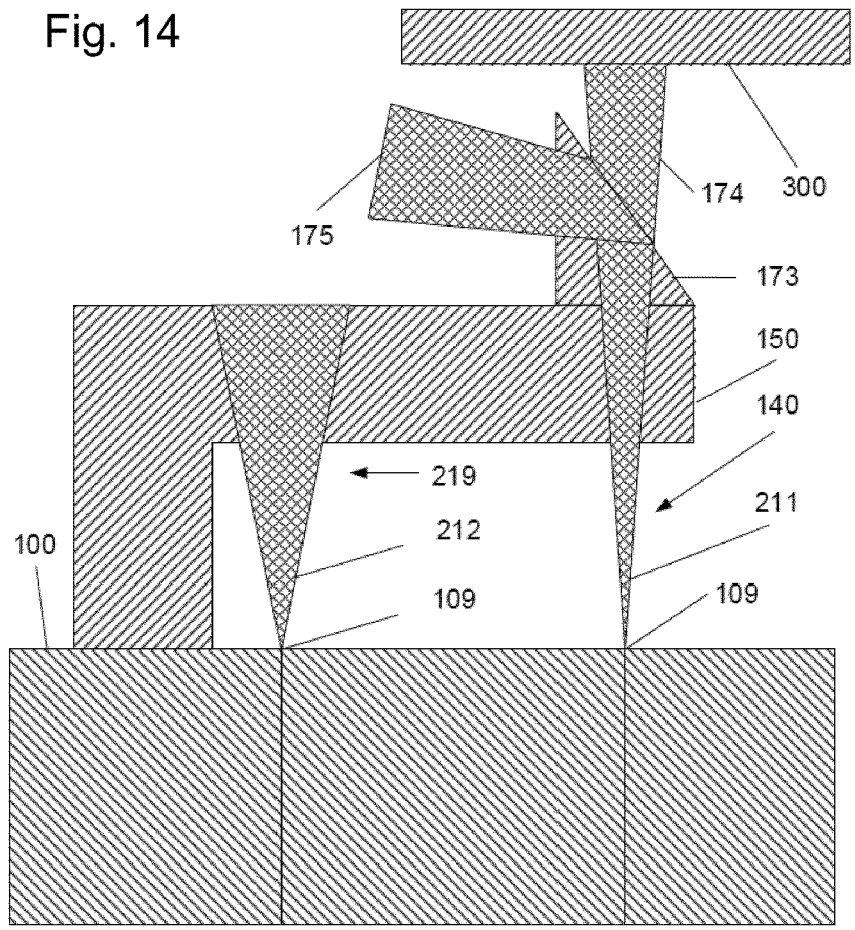
FIG. 14 shows a schematic illustration of one exemplary embodiment in which the optomechanical structure is supplemented by a structure which preferably prevents interference signals.

FIG. 14 shows a further embodiment of the optomechanical structure 150, which has been supplemented by a third partial region 173, which can suppress undesired feedback of the optical sensor signal 211. In this regard, without the third partial region 173, a portion 174 of the optical sensor signal 211 would be reflected at the sample 300 and couple into the optical subsystem 100 at a point 109. This can result in a disturbance of the optical sensor element 140 configured to detect the position of the optomechanical structure 150. The structure of the third partial region 173 can deflect the optical sensor signal 211 in particular by reflection, total internal reflection and/or light refraction in such a way that said signal takes a beam path 175 from which it cannot be reflected back. The beam path 175 is advantageously constituted in particular in such a way that as far as possible no feedbacks in the optomechanical structure 150 can occur.

Figure 15:
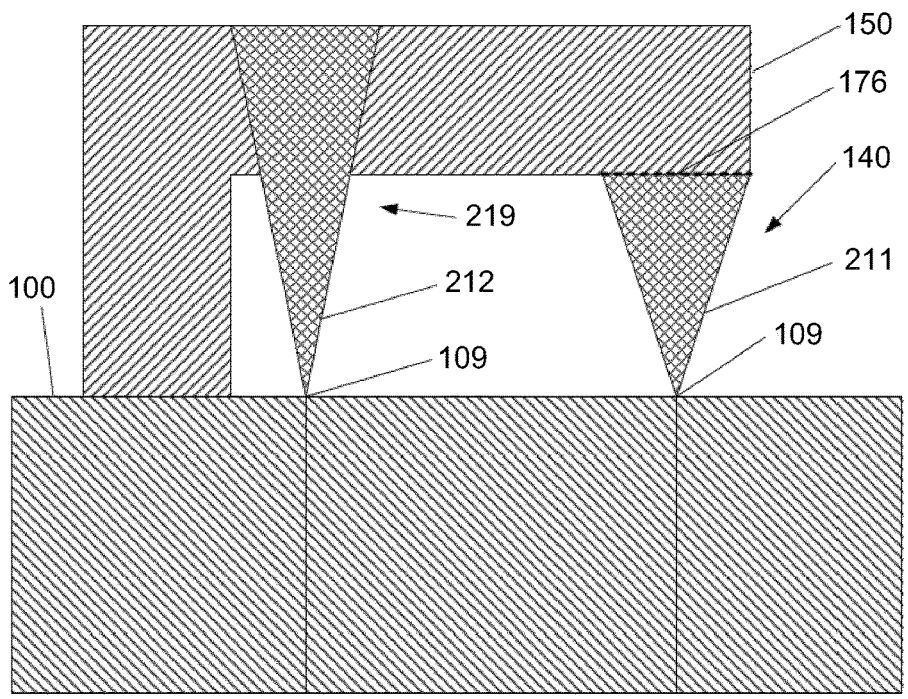
FIG. 15 shows a schematic illustration of one exemplary embodiment in which the optical structure has a structuring in the sub-wavelength range of the sensor signal.

FIG. 15 shows a further embodiment of the optomechanical structure 150 comprising a diffractive structure element 176, which preferably has a structure size smaller than the light wavelength of the optical sensor signal 211. Preferably, a particularly sensitive sensor element 140 can be produced as a result.

Figure 16:
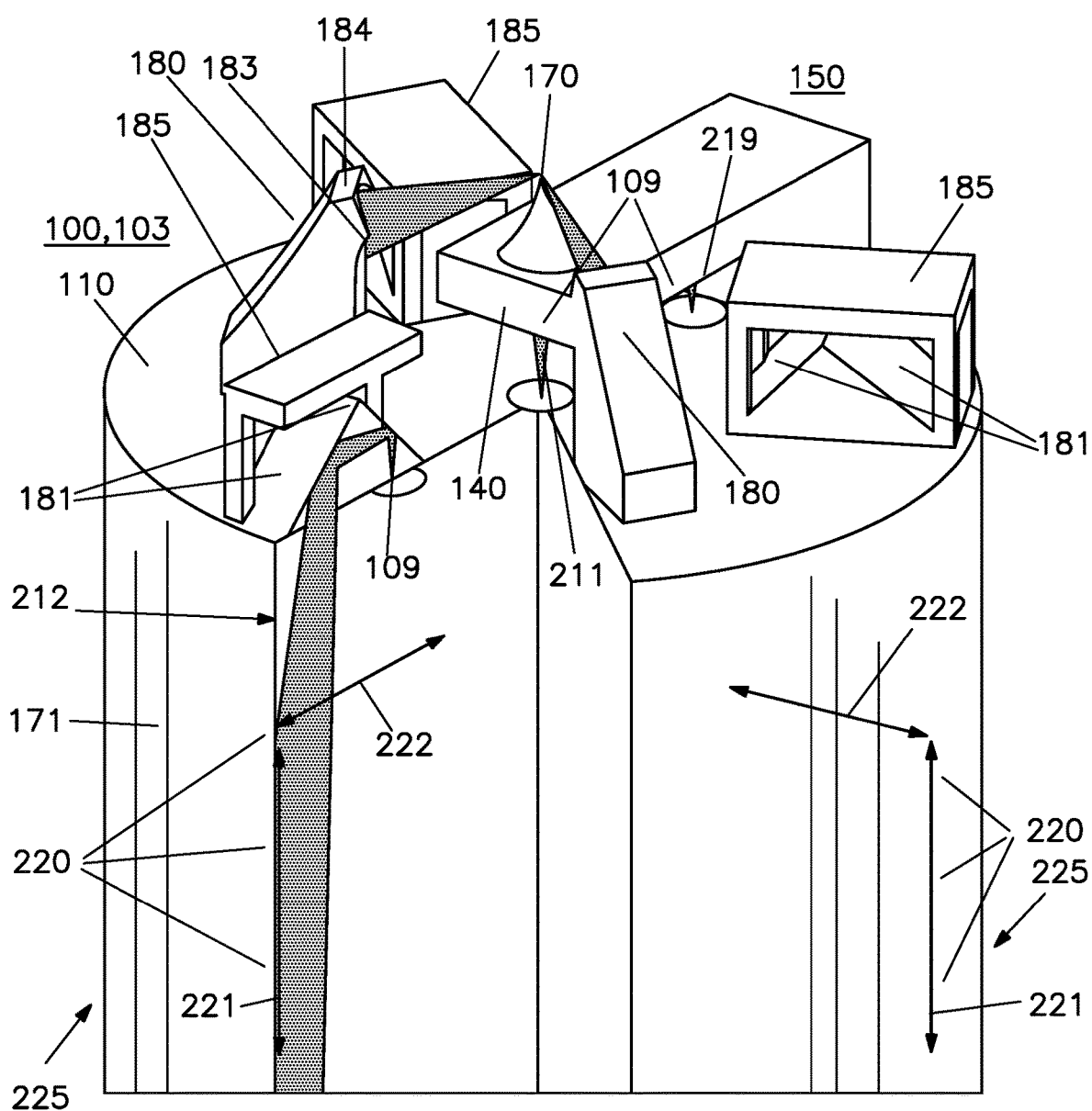
FIG. 16 shows a schematic illustration of one exemplary embodiment in which the position of a structure can be altered by means of an actuator signal.

FIG. 16 shows a further embodiment of the optomechanical structure 150 suitable for heating a multi-core fiber 103 at the points 220 in such a way that movements 222 in the form of translations occur. By virtue of the presence of at least three actuators 255 of this type, the optomechanical structure 150 can be moved in three mutually independent spatial directions. In FIG. 16, the multi-core fiber is cut away such that the beam path of the optical actuator signal 212 is visible.

Figure 17:
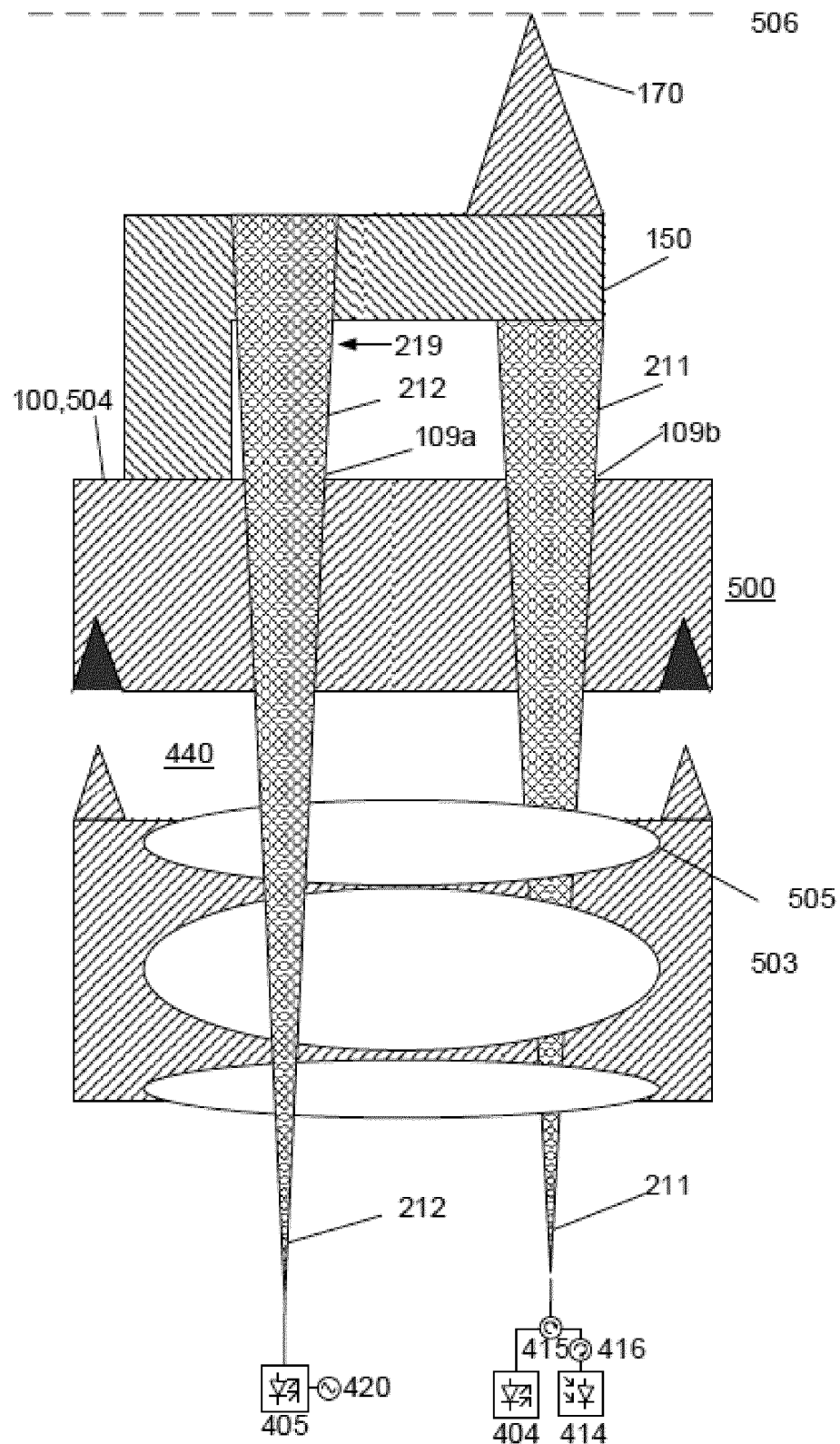
FIG. 17 shows a schematic illustration of one exemplary embodiment in which the optomechanical structure is situated at an objective.

FIG. 17 shows one particularly preferred configuration of a micro-optomechanical system 500. In this case, the optical subsystem 100 is designed as a component 504, which can be secured to an objective 503. The component 504 can be a transparent object, for example an objective carrier, or a small structure such as an optical fiber, for example, which can project laterally into the image field of the objective 503. However, the transparent component 504 can also be printed directly onto a lens 505 of the objective 503. The objective 503 can be an objective of a device for two-photon polymerization which, by means of a specularly reflective surface, can print on itself or a correspondingly mounted objective carrier. However, the component 504 can also be an immersion objective or an air objective. In this case, the optomechanical structure 150 can be controlled by means of the optical actuator signal 212 and/or be read by means of the optical sensor signal 211. In one particularly preferred embodiment, the devices for generating the signals 211, 212 can be embodied as movable, such that they can be aligned with the optomechanical structure 150, preferably by means of a device within the micro-optomechanical system 500. In one particularly preferred embodiment, the tip 170 of the optomechanical structure 150 can lie in the focal plane 506 of the objective 503. In one particularly preferred embodiment, the optical component 504 can furthermore be mounted such that it is movable relative to the objective 503 in such a way that it can perform a scanning movement.

LIST OF REFERENCE SIGNS

100 Optical subsystem
101 Single-mode fibers (SMF)
102 Fiber array
103 Multi-core fiber
104 Optical chip
105 Electrical conductor track
106 Base board with electrical conductor tracks
107 Electrical contact wires 108 Freeform optical waveguide, produced in the same process as the optomechanical structure 150
109 Coupling point
110 Optical facet
111 Optical waveguide
112 Optical waveguide branching junction
113 Optical filter structures
114 Optical modulator of the optical intensity
115 Optical structure for output coupling from a waveguide (grating coupler, emission structure)
116 Optical facet of the chip 104
117 Further facet of the chip 104
118 Tapered waveguide
120 Coating
121 Coating of the freeform mirror 166
140 Optomechanical sensor element
150 Optomechanical structure
151 Second optomechanical structure
152 Third optomechanical structure
153 Fourth optomechanical structure
154 Partial structure of the optomechanical structure which alters the flow resistance
155 Partial structure of the optomechanical structure 150 which alters the flow resistance more than 154
156 Partial structure of the optomechanical structure 150 which brings about an alteration of light 190 in the directions 191 and 192 in the event of a movement of the optomechanical structure 150
159 Lasing medium in an optical resonator between optical subsystem 100 and optomechanical structure 150
160 Optical resonator between optical subsystem 100 and optomechanical structure 150
161 Length of the optical resonator 160
162 Portion of the light that is reflected at the facet 110 of the optical subsystem 100
163 Portion of the light that is transmitted through the facet 110 of the optical subsystem 100 with a direction of propagation toward the optomechanical structure 150
164 Portion of the light that is reflected at the freeform mirror 166
165 Portion—transmitted through the facet 110 of the optical subsystem 100—of the light which was reflected beforehand at least once at the optomechanical structure 150
166 Freeform mirror
167 Standing wave
168 Portion of the light coming from the optical subsystem 100 that impinges on the facet 110
169 Portion of the light that is reflected at the facet 110
170 Tip
171 Coating
172 Second partial region of the optomechanical structure 150, which fosters mechanical actuation
173 Third partial region of the optical subsystem, which prevents interaction of the signal 211 with objects other than the optical subsystem 100
174 Beam path without the third partial region 173
175 Beam path with the third partial region 173
176 Diffractive structures
180 Coated freeform mirror
181 Mirror with total internal reflection (TIR)
182 Freeform lens
183 Further freeform lens
184 Shielding structure for the freeform lens 183 against undesired coating
185 Shielding structure for the mirror 181 against undesired coating
186 Further mirror with total internal reflection
190 Direction of light that is transmitted by the optomechanical structure in the absence of the optical signal 211
191 Direction of light that is transmitted by the optomechanical structure and deflected by a bending on account of an optical signal 211
192 Direction of light that is transmitted by the optomechanical structure and deflected by a bending on account of an optical signal 211
211 Optical sensor signal
212 Optical actuator signal
213 Third optical signal
214 Further optical signal
215 Feedback of the third optical signal 213 into the optical subsystem 100
216 Optical actuator signal, more intense than 212
219 Actuator element
220 Light input
221 Stresses arising as a result of light input 220
222 Movement arising as a result of the stress 221
223 Movement
224 Distance in z-direction between optical subsystem 100 and sample 300 at the contact point between the tip 170 and the sample 300
225 Actuator element that brings about a translation of the optical structure 150
300 Sample
301 Laser
302 Emission direction of the laser
303 Contact pads for electrically contacting the laser 301
304 Optical resonator of the laser
305 Mirror of the laser
306 Electrical contact needle
307 Spring
310 Fluid
311 Direction of movement of the fluid 310
400 Optical fiber
401 Further type of optical fiber
402 Fiber-optic polarization controller
403 Laser for illuminating the tip, in particular also white light laser, superluminescence diodes, or Swept-Source laser
404 Sensor laser
405 Actuator laser
406 Position sensor laser
407 Multimode fiber
413 Photodiode, configured for receiving light excited by the laser 403
414 Photodiode, configured for receiving light of the laser 404
415 Circulator
416 Isolator
417 Photodiode, configured for receiving light of the laser 406
420 Signal generator
421 Further signal generator
430 Optical signal processing unit as partial component of the optical subsystem 100
440 Pluggable connection between signal processing 430 and optical subsystem 100
441 Coupling points of the plug 440
500 Micro-optomechanical system
503 Objective
504 Component that can be mounted at an objective 505 Lenses of an objective
506 Focal plane of the objective 503
1000 Coordinate system

The invention claimed is:

1. A micro-optomechanical system, comprising
at least one optical subsystem configured for emitting at least one optical actuator signal and for receiving at least one optical sensor signal;
at least one optomechanical structure which is produced from a photoresist in direct contact with the optical subsystem by means of a direct writing microstructuring method, wherein the direct writing microstructuring method is an additive method, wherein the optomechanical structure comprises at least one optical actuation element and at least one optical sensor element,
wherein the optical actuator signal in interaction with the optical actuation element is configured for changing a mechanical state of the optomechanical structure, wherein the optical sensor signal in interaction with the optical sensor element is configured for detecting the change in the mechanical state of the optomechanical structure or a variable related thereto, and wherein the optical actuation element and the optical sensor element are integrated in the optomechanical structure to form an inseparable unit;
wherein the optical subsystem has a facet;
wherein the optical sensor element has a freeform mirror, wherein the optical sensor element is designed as an optical resonator, wherein the optical resonator is formed between the facet and the freeform mirror, wherein the freeform mirror is positioned at a free end of the optomechanical structure; and
wherein the optical actuation element includes a heating location on the optomechanical structure where the optical actuator signal impinges to heat the optical actuation element to cause movement, wherein the heating location is positioned proximal to a fixed end of the optomechanical structure that is opposite to the free end.

2. The micro-optomechanical system as claimed in claim 1, wherein the optomechanical structure and the facet are positioned to form an optical resonator configured to detect position of the optomechanical structure.

3. The micro-optomechanical system as claimed in claim 1, wherein the change in the mechanical state of the optomechanical structure or the variable related thereto comprises at least one mechanical change in a fiber-optical component of the optomechanical structure, the fiber-optical component is selected from a group consisting of an optical fiber, a single-mode fiber, a multi-core fiber, and a fiber array.

4. The micro-optomechanical system as claimed in claim 1, wherein the mechanical change comprises a movement selected from a group consisting of bending, translation, oscillation, tilting, contraction, expansion and torsion of the optomechanical structure or of at least one partial region thereof.

5. The micro-optomechanical system as claimed in claim 4, wherein the optomechanical structure has a light-sensitive coating configured for exciting or amplifying a conversion of the optical actuator signal into the movement.

6. The micro-optomechanical system as claimed in claim 4, wherein the optomechanical structure has at least one second partial region configured for exciting or for amplifying the conversion of the optical actuator signal into the movement.

7. The micro-optomechanical system as claimed in claim 6, wherein the second partial region differs from the rest of the optomechanical structure in terms of one or more of a different coefficient of thermal expansion, a different light absorption coefficient or a structure size smaller than the light wavelength of the light radiated in with the optical actuator signal.

8. The micro-optomechanical system as claimed in claim 1, wherein:
the optical sensor element has a resonant optical structure; and
the optical actuation element is configured for altering a resonant frequency of the resonant optical structure.

9. The micro-optomechanical system as claimed in claim 1, wherein:
the optical sensor element has an interferometric optical structure; and
the optical actuation element is configured for altering a transmission of the interferometric optical structure.

10. The micro-optomechanical system as claimed in claim 1, wherein the optical sensor element comprises a structure element having a structure size smaller than a light wavelength of the optical sensor signal.

11. The micro-optomechanical system as claimed in claim 1, wherein the optomechanical structure has a cantilever configured for measurements of surface profiles.

12. The micro-optomechanical system as claimed in claim 1, wherein the optical subsystem has a fiber plug.

13. The micro-optomechanical system as claimed in claim 1, wherein the optical subsystem has a micro-optical component.

14. The micro-optomechanical system as claimed in claim 1, wherein the optical subsystem has an optical amplifier.

15. The micro-optomechanical system as claimed in claim 1, wherein the optical subsystem has an optical signal processing unit.

16. The micro-optomechanical system as claimed in claim 1, wherein the optical actuator signal interacts with the optomechanical structure at an actuator coupling point, the optical subsystem has an alignment mark fitted on the optical subsystem, and the relative position of the alignment mark in relation to the coupling point of the optical subsystem has an accuracy better than 10 μm.

17. A micro-optomechanical system, comprising
at least one optical subsystem configured for emitting at least one optical actuator signal and for receiving at least one optical sensor signal;
at least one optomechanical structure which is produced from a photoresist in direct contact with the optical subsystem by means of a direct writing microstructuring method, wherein the direct writing microstructuring method is an additive method, wherein the optomechanical structure comprises at least one optical actuation element and at least one optical sensor element,
wherein the optical actuator signal in interaction with the optical actuation element is configured for changing a mechanical state of the optomechanical structure, wherein the optical sensor signal in interaction with the optical sensor element is configured for detecting the change in the mechanical state of the optomechanical structure or a variable related thereto, and wherein the optical actuation element and the optical sensor element are integrated in the optomechanical structure to form an inseparable unit;
wherein the optical subsystem has a facet;

wherein the optical sensor element has a freeform mirror, wherein the freeform mirror is positioned at a free end of the optomechanical structure;

wherein the optical actuation element includes a heating location on the optomechanical structure where the optical actuator signal impinges to heat the optical actuation element to cause movement, wherein the heating location is positioned proximal to a fixed end of the optomechanical structure that is opposite to the free end; and wherein the optomechanical structure has a tip, wherein the tip is located at the free end of the optomechanical structure, wherein the tip extends from a side of the optomechanical structure that is opposite to the facet to be in proximity to a sample to be examined, wherein the tip is made of the same material as the optomechanical structure, wherein the tip is produced at the same time with the optomechanical structure to be integral with the optomechanical structure.

18. The micro-optomechanical system as claimed in claim 17, wherein the optomechanical structure and the facet are positioned to form an optical resonator configured to detect position of the optomechanical structure.

19. The micro-optomechanical system of claim 17, wherein the change in the mechanical state of the optomechanical structure or the variable related thereto comprises at least one mechanical change in a fiber-optical component of the optomechanical structure, the fiber-optical component is selected from a group consisting of an optical fiber, a single-mode fiber, a multi-core fiber, and a fiber array.

20. The micro-optomechanical system as claimed in claim 17, wherein the mechanical change comprises a movement selected from a group consisting of bending, translation, oscillation, tilting, contraction, expansion and torsion of the optomechanical structure or of at least one partial region thereof.

21. The micro-optomechanical system as claimed in claim 20, wherein the optomechanical structure has a light-sensitive coating configured for exciting or amplifying a conversion of the optical actuator signal into the movement.

22. The micro-optomechanical system as claimed in claim 20, wherein the optomechanical structure has at least one second partial region configured for exciting or for amplifying the conversion of the optical actuator signal into the movement.

23. The micro-optomechanical system as claimed in claim 22, wherein the second partial region differs from the rest of the optomechanical structure in terms of one or more of a different coefficient of thermal expansion, a different light absorption coefficient or a structure size smaller than the light wavelength of the light radiated in with the optical actuator signal.

24. The micro-optomechanical system as claimed in claim 17, wherein:
the optical sensor element has a resonant optical structure; and
the optical actuation element is configured for altering a resonant frequency of the resonant optical structure.

25. The micro-optomechanical system as claimed in claim 17, wherein:
the optical sensor element has an interferometric optical structure; and
the optical actuation element is configured for altering a transmission of the interferometric optical structure.

26. The micro-optomechanical system as claimed in claim 17, wherein the optical sensor element comprises a structure element having a structure size smaller than a light wavelength of the optical sensor signal.

27. The micro-optomechanical system as claimed in claim 17, wherein the optomechanical structure has a cantilever configured for measurements of surface profiles.

28. The micro-optomechanical system as claimed in claim 17, wherein the optical subsystem has a fiber plug.

29. The micro-optomechanical system as claimed in claim 17, wherein the optical subsystem has a micro-optical component.

30. The micro-optomechanical system as claimed in claim 17, wherein the optical subsystem has an optical amplifier.

31. The micro-optomechanical system as claimed in claim 17, wherein the optical subsystem has an optical signal processing unit.

32. The micro-optomechanical system of claim 17, wherein the optical actuator signal interacts with the optomechanical structure at an actuator coupling point, the optical subsystem has an alignment mark fitted on the optical subsystem, and the relative position of the alignment mark in relation to the coupling point of the optical subsystem has an accuracy better than 10 μm.

* * * * *